US011231806B2

(12) United States Patent
Choi et al.

(10) Patent No.: US 11,231,806 B2
(45) Date of Patent: Jan. 25, 2022

(54) ELECTRONIC DEVICE INCLUDING ELECTRONIC PEN AND METHOD OF CONTROLLING COMMUNICATION CONNECTION BETWEEN ELECTRONIC DEVICE AND ELECTRONIC PEN

(71) Applicant: Samsung Electronics Co., Ltd., Suwon-si (KR)

(72) Inventors: Jongmu Choi, Suwon-si (KR); Byunghoon Kang, Suwon-si (KR); Banghyun Kwon, Suwon-si (KR); Hyunwoong Kwon, Suwon-si (KR); Chunho Park, Suwon-si (KR); Namyong Kang, Suwon-si (KR); Doosuk Kang, Suwon-si (KR); Bokun Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 120 days.

(21) Appl. No.: 16/531,560

(22) Filed: Aug. 5, 2019

(65) Prior Publication Data
US 2020/0050338 A1    Feb. 13, 2020

(30) Foreign Application Priority Data
Aug. 8, 2018  (KR) .................. 10-2018-0092716

(51) Int. Cl.
*G06F 3/041* (2006.01)
*G06F 3/0354* (2013.01)
(Continued)

(52) U.S. Cl.
CPC ...... *G06F 3/04162* (2019.05); *G06F 3/03545* (2013.01); *H02J 50/12* (2016.02); *H02J 50/80* (2016.02); *H02J 50/90* (2016.02)

(58) Field of Classification Search
CPC combination set(s) only.
See application file for complete search history.

(56) References Cited

U.S. PATENT DOCUMENTS 9,853,458 B1   12/2017   Bell et al.
9,892,076 B2   2/2018   Chan
(Continued)

FOREIGN PATENT DOCUMENTS

JP      2011-217006 A     10/2011
KR    10-1377345 B1      3/2014
(Continued)

OTHER PUBLICATIONS

International Search Report dated Nov. 29, 2019, issued in International Patent Application No. PCT/KR2019/009741.
(Continued)

*Primary Examiner* — Michael J Jansen, II
*Assistant Examiner* — Sosina Abebe
(74) *Attorney, Agent, or Firm* — Jefferson IP Law, LLP

(57) ABSTRACT

An electronic device including an electronic pen and a method of controlling a communication connection with the electronic pen is provided. The electronic device include a housing, a touch-screen display, a first wireless communication circuit, an extended recess disposed inside the housing, a first wireless charging circuit; an electronic pen including a second wireless communication circuit and a second wireless charging circuit electrically coupled to the first wireless charging circuit, a processor, and a memory. The memory stores instructions causing the processor to detect whether the electronic pen is inserted into the recess, charge the electronic pen through the first wireless charging circuit based on the detection, receive inherent information of the electronic pen through the first wireless communication circuit during or after the charging, and maintain or
(Continued)

re-establish a communication connection with the electronic pen based on at least a portion of the received inherent information.

20 Claims, 16 Drawing Sheets

(51) Int. Cl.
  *H02J 50/12* (2016.01)
  *H02J 50/90* (2016.01)
  *H02J 50/80* (2016.01)

(56) References Cited

U.S. PATENT DOCUMENTS

| | | | |
|---|---|---|---|
| 10,070,212 B2 | 9/2018 | Watson et al. | |
| 2008/0291178 A1* | 11/2008 | Chen | G06F 1/1698 345/179 |
| 2011/0286615 A1 | 11/2011 | Olodort et al. | |
| 2013/0095753 A1* | 4/2013 | Chen | H04L 67/104 455/41.1 |
| 2014/0253462 A1* | 9/2014 | Hicks | G06F 3/03545 345/173 |
| 2014/0253469 A1* | 9/2014 | Hicks | G06F 3/03545 345/173 |
| 2015/0050886 A1 | 2/2015 | Donaldson | |
| 2016/0190839 A1* | 6/2016 | Otsuka | H02J 7/0044 320/115 |
| 2016/0337496 A1* | 11/2016 | Jeganathan | H04W 76/14 |
| 2017/0013342 A1 | 1/2017 | Watson et al. | |
| 2017/0093175 A1 | 3/2017 | Shao et al. | |
| 2017/0097724 A1* | 4/2017 | Kobori | G06F 3/03545 |
| 2017/0115755 A1* | 4/2017 | Jung | A61B 5/0205 |
| 2017/0249522 A1* | 8/2017 | Lee | G06F 3/038 |
| 2018/0024657 A1* | 1/2018 | Ninomiya | G06F 3/03545 345/179 |
| 2019/0278390 A1* | 9/2019 | Chiang | G06F 1/1684 |
| 2021/0124434 A1* | 4/2021 | Bakema | G06F 3/03542 |

FOREIGN PATENT DOCUMENTS

| | | |
|---|---|---|
| KR | 10-2016-0068099 A | 6/2016 |
| KR | 20160068099 A * | 6/2016 |
| KR | 10-2016-0143572 A | 12/2016 |
| WO | 2008/085514 A2 | 7/2008 |

OTHER PUBLICATIONS

European Search Report dated Jun. 17, 2021, issued in European Application No. 19848197.0-1216.

* cited by examiner

ELECTRONIC DEVICE INCLUDING ELECTRONIC PEN AND METHOD OF CONTROLLING COMMUNICATION CONNECTION BETWEEN ELECTRONIC DEVICE AND ELECTRONIC PEN

CROSS-REFERENCE TO RELATED APPLICATION(S)

This application is based on and claims priority under 35 U.S.C. § 119(a) of a Korean patent application number 10-2018-0092716, filed on Aug. 8, 2018, in the Korean Intellectual Property Office, the disclosure of which is incorporated by reference herein in its entirety.

BACKGROUND

1. Field

The disclosure relates to an electronic device including an electronic pen and a method of controlling a communication connection between the electronic device and the electronic pen.

2. Description of Related Art

Electronic devices (e.g., mobile terminals, smartphones, or wearable devices) may provide various functions. Smartphones may provide not only a basic voice call function but also a Wi-Fi function, a Near Field Communication (NFC) function, a mobile communication ($3^{rd}$-Generation (3G), $4^{th}$-Generation (4G), or $5^{th}$-Generation (5G)) function, a music or video reproduction function, a photographing function, or a navigation function.

Further, the electronic devices may support a function of short-range wireless communication (using, e.g., Bluetooth Low Energy (BLE)) with an external electronic device.

The above information is presented as background information only to assist with an understanding of the disclosure. No determination has been made, and no assertion is made, as to whether any of the above might be applicable as prior art with regard to the disclosure.

SUMMARY

External electronic devices (e.g., electronic pens) supporting short-range wireless communication (e.g., BLE) with an electronic device may transmit an advertising signal and may connect for wireless communication with the electronic device receiving the advertising signal. However, when there are a plurality of electronic devices within the range of the advertising signal, the external electronic device may establish the communication connection with another electronic device rather than the target electronic device to which the external electronic device should be connected (e.g., the electronic device to which the external electronic device is inserted).

Similarly, when there is a plurality of external electronic devices in the vicinity of the electronic device and the plurality of external electronic devices transmits an advertising signal, the electronic device may connect for short-range wireless communication with another external electronic device rather than the target external electronic device (e.g., an electronic pen inserted into the electronic device).

Aspects of the disclosure are to address at least the above-mentioned problems and/or disadvantages and to provide at least the advantages described below. Accordingly, an aspect of the disclosure, in order to connect for communication with a target external electronic device (e.g., an electronic pen inserted into the electronic device), is to provide the electronic device may apply charging power to the external electronic device and identify the target external electronic device on the basis of inherent (or unique) information (e.g., a Bluetooth address) received from the external electronic device or charging-related information.

Another aspect of the disclosure, when a target external electronic device (e.g., an electronic pen inserted into an electronic device) connected for communication is an external electronic device having a previous connection history, is to provide the target external electronic device may maintain the communication connection, and when the target external electronic device is an external electronic device having no previous connection history, the target external electronic device may perform a procedure for establishing the communication connection (e.g., pairing) with the target external electronic device.

Additional aspects will be set forth in part in the description which follows and, in part, will be apparent from the description, or may be learned by practice of the presented embodiments.

In accordance with an aspect of the disclosure, an electronic device is provided. The electronic device includes a housing, a touch-screen display exposed through a portion of the housing, a first wireless communication circuit disposed inside the housing, a recess disposed inside the housing, a first wireless charging circuit disposed inside the housing so as to be adjacent to the recess, an electronic pen including a second wireless communication circuit inserted to be removable from the recess and configured to perform wireless communication with the first wireless communication circuit, and a second wireless charging circuit electrically coupled to the first wireless charging circuit, a processor disposed inside the housing and operatively connected to the first wireless communication circuit and the first wireless charging circuit, and a memory operatively connected to the processor. The memory stores instructions causing the processor to, when executed, detect whether the electronic pen is inserted into the recess, charge the electronic pen through the first wireless charging circuit based on the detection, receive inherent information of the electronic pen through the first wireless communication circuit during or after charging, and maintain or re-establish a communication connection with the electronic pen based on at least a portion of the received inherent information.

In accordance with another aspect of the disclosure, an electronic device is provided. The electronic device includes a housing, a touch-screen display exposed through a portion of the housing, a first wireless communication circuit disposed inside the housing, a recess disposed inside the housing, a first wireless charging circuit disposed inside the housing to be adjacent to the recess, a processor disposed inside the housing and operatively coupled to the display, the first wireless communication circuit, and the first wireless charging circuit, and a memory operatively coupled to the processor, wherein the memory stores instructions causing the processor to, when executed, detect whether an electronic pen is inserted into the recess, charge the electronic pen through the first wireless charging circuit based on the detection, perform a scan through the first wireless communication circuit in order to identify information on the electronic pen, turn on or off the first wireless charging circuit in a predetermined pattern in response to discovery of a plurality of electronic pens through the scan, identify the electronic pen inserted into the recess among the plurality of electronic pens based on charging-related information included in advertising signals received from the plurality of found electronic pens, and establish a communication connection with the identified electronic pen.

In accordance with another aspect of the disclosure, a method of controlling a communication connection by an electronic device is provided. The method includes detecting whether an electronic pen is inserted into a recess inside a housing, charging the electronic pen through a wireless charging circuit based on the detection, receiving inherent information of the electronic pen through a wireless communication circuit during or after charging, and maintaining or re-establishing the communication connection with the electronic pen based on at least a portion of the received inherent information.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
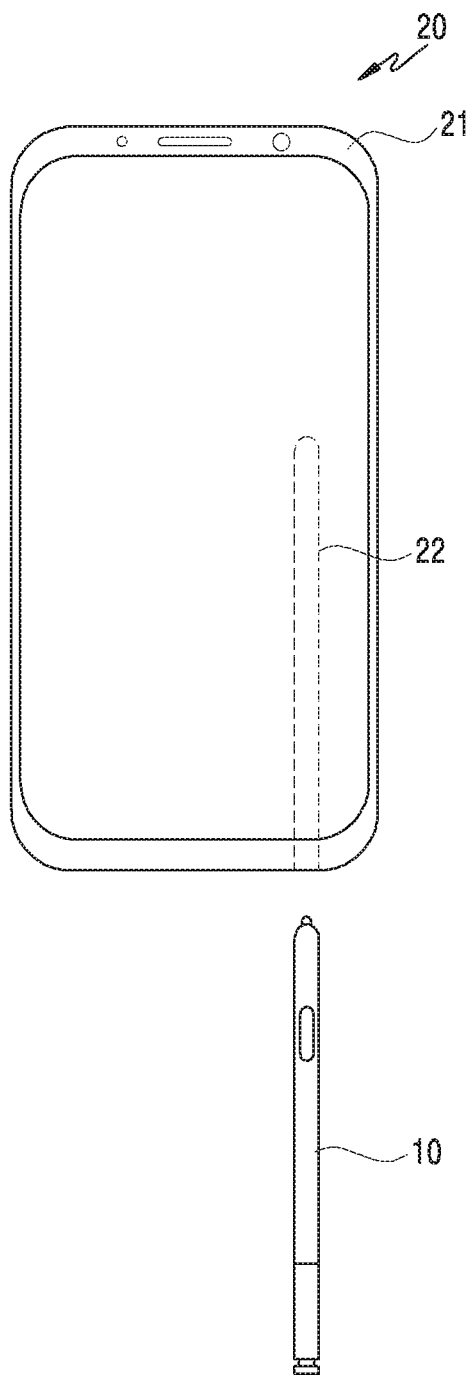
FIG. 1 illustrates an electronic device and an electronic pen according to an embodiment of the disclosure.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skilled in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Various embodiments of the disclosure may include an electronic device and an external electronic device capable of performing short-range wireless communication (e.g., BLE). The electronic device may be various electronic devices that may provide charging power to the external electronic device. For example, the electronic device may be a smartphone, a tablet Personal Computer (PC), or a notebook PC. The electronic device may operate as a scanner and a charging-power-providing device.

The external electronic device may be any of various electronic devices that may receive charging power from the electronic device and transmit an advertising signal for a connection to short-range wireless communication. For example, the external electronic device may include a battery and an accessory device, such as an electronic pen or a protective case, which is inserted into a recess formed in one side of the electronic device, and may receive charging power from the electronic device. The external electronic device may operate as an advertiser.

The electronic device may be a vehicle supporting wireless charging and communication connection of the external electronic device (e.g., a smartphone). For example, when the smartphone is positioned at a predetermined location (e.g., a location at which a wireless charging pad is installed), the vehicle may provide charging power to the smartphone and establish a short-range wireless communication connection with the smartphone.

The electronic device may be an inspection device for checking whether the external electronic device (e.g., the smartphone) has an error. For example, when the smartphone is positioned at the predetermined location, the inspection device may provide charging power to the smartphone, establish the short-range wireless communication connection with the smartphone, and check whether the smartphone has an error.

Hereinafter, the case in which the external electronic device is an electronic pen will be described by way of example for convenience of description.

FIG. 1 illustrates an electronic device and an electronic pen according to an embodiment of the disclosure.

Referring to FIG. 1, an electronic pen (or a stylus pen) 10 according to an embodiment of the disclosure may be disposed inside a housing 21 of an electronic device 20, and may be stored in a recess 22 so as to be capable of being removed therefrom. The electronic pen 10 may support wireless communication (e.g., wireless communication based on a Bluetooth protocol) and may include a rechargeable battery (not shown). The wireless communication may be Bluetooth Low Energy (BLE) communication.

When the electronic pen 10 is inserted into the electronic device 20, the electronic pen 10 may receive power from the electronic device 20 and charge the battery with the received power. The electronic pen 10 may output (e.g., broadcast) an advertising signal during charging. For example, the electronic pen 10 may output the advertising signal for a predetermined time (e.g., 25 seconds) at predetermined intervals (e.g., 100 ms). When the power of the battery is equal to or less than a predetermined level (e.g., 5%), the electronic pen 10 may first perform charging up to a predetermined level (e.g., 10%) and then output the advertising signal. When the electronic pen 10 is removed from the electronic device 20, the electronic pen 10 may output the advertising signal. For example, communication of the electronic pen 10 may be disconnected due to an unknown error in the state in which the electronic pen 10 is inserted into the electronic device 20. When the electronic pen 10 is removed from the electronic device 20 in the state in which the communication connection with the electronic device 20 is disconnected, the electronic pen 10 (e.g., a second wireless communication circuit 409 of FIG. 4) may attempt the communication connection with the electronic device 20 by outputting the advertising signal. To this end, the electronic pen 10 may further include a means (e.g., a sensor) for detecting whether the electronic pen 10 is removed from the electronic device 20. When removal of the electronic pen 10 from the electronic device 20 is detected, the electronic device 20 may activate (perform) a scan operation for a predetermined time (e.g., 20 seconds).

When a predetermined button is input (e.g., pressed) for a predetermined time (e.g., 3 seconds), the electronic pen 10 may output the advertising signal. For example, when removal of the electronic pen 10 is detected and the electronic pen 10 is not connected for communication for a predetermined time (e.g., 5 seconds), the electronic device 20 may output a popup message indicating that the electronic pen 10 is not connected for communication and indicating a connection method through the display. When detecting the removal or after outputting the popup message, the electronic device 20 may activate (perform) the scan operation for a predetermined time (e.g., 20 seconds). The user may attempt to establish the communication connection between the electronic device 20 and the electronic pen 10 by pressing a predetermined button of the electronic pen 10 for a predetermined time or longer and making the electronic pen 10 output the advertising signal.

The electronic device 20 according to an embodiment of the disclosure may be a smartphone or a tablet Personal Computer (PC) into which the electronic pen 10 can be inserted (attached or connected). The electronic device 20 may support wireless communication (e.g., wireless communication based on a Bluetooth protocol) with the electronic pen 10. The wireless communication may be BLE communication.

When insertion of the electronic pen 10 is detected, the electronic device 20 may provide charging power to the electronic pen 10. For example, the electronic device 20 may detect insertion of the electronic pen 10 through various methods and charge a battery (not shown) positioned inside the electronic pen 10 by applying charging power to the electronic pen 10. The method of detecting insertion of the electronic pen 10 will be described below with reference to FIG. 5A.

The electronic device 20 may identify whether the inserted electronic pen 10 is an electronic pen having a previous communication connection history (e.g., pairing). The electronic device 20 may compare reference inherent (or unique) information (e.g., a device address) stored in memory (not shown) with inherent information received from the electronic pen connected for communication and identify whether the inserted electronic device 10 is an electronic pen having a previous communication connection history (e.g., pairing).

When the inserted electronic pen 10 is the electronic pen having the previous communication connection history, the electronic device 20 may maintain the communication connection. When the electronic pen 10 is inserted in the state in which the electronic pen 10 is connected for communication, the electronic device 20 may maintain the communication connection.

According to another embodiment of the disclosure, when the inserted electronic pen 10 is not an electronic pen having a previous communication connection history, the electronic device 20 may initialize (e.g., reboot) the inserted pen 10 or delete (or format) pairing-related data and establish the communication connection with the inserted electronic pen 10. When the electronic pen 10 is inserted in the state in which a communication connection with another electronic pen (not shown) has been established, the electronic device 20 may terminate the communication connection with the other electronic pen and then establish the communication connection with the inserted electronic pen 10 (or establish the communication connection after initialization).

When the number of electronic pens capable of establishing a communication connection is plural, the electronic device 10 may identify the electronic pen inserted into the electronic device 10 among the plurality of electronic pens. For example, the electronic device 10 may identify the electronic pen inserted into the electronic device 10 among the plurality of electronic pens on the basis of the advertising signal or charging-related information. A detailed description thereof will be given below with reference to FIGS. 8 to 11.

Figure 2:
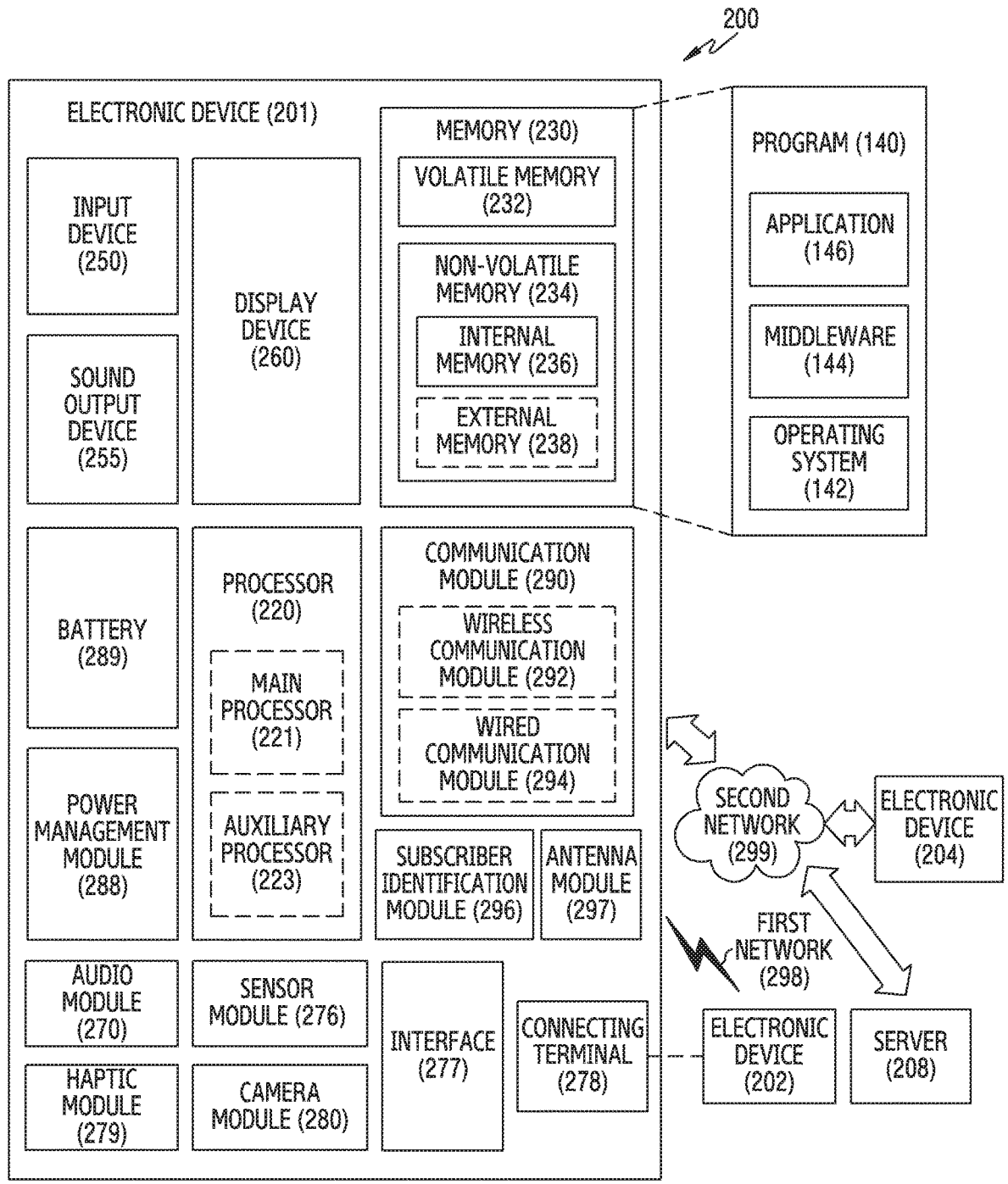
FIG. 2 is a block diagram of an electronic device within a network environment according to an embodiment of the disclosure.

FIG. 2 is a block diagram illustrating an electronic device in a network environment according to an embodiment of the disclosure.

Referring to FIG. 2, the electronic device 201 (e.g., the electronic device 20 of FIG. 1) in the network environment 200 may communicate with an electronic device 202 via a first network 298 (e.g., a short-range wireless communication network), or an electronic device 204 or a server 208 via a second network 299 (e.g., a long-range wireless communication network). The electronic device 201 may communicate with the electronic device 204 via the server 208. The electronic device 201 may include a processor 220, memory 230, an input device 250, a sound output device 255, a display device 260, an audio module 270, a sensor module 276, an interface 277, a haptic module 279, a camera module 280, a power management module 288, a battery 289, a communication module 290, a subscriber identification module (SIM) 296, or an antenna module 297. At least one (e.g., the display device 260 or the camera module 280) of the components may be omitted from the electronic device 201, or one or more other components may be added in the electronic device 201. Some of the components may be implemented as single integrated circuitry. For example, the sensor module 276 (e.g., a fingerprint sensor, an iris sensor, or an illuminance sensor) may be implemented as embedded in the display device 260 (e.g., a display).

The processor 220 may execute software (e.g., a program 240) to control at least one other component (e.g., a hardware or software component) of the electronic device 201 coupled with the processor 220, and may perform various data processing or computation. As at least part of the data processing or computation, the processor 220 may load a command or data received from another component (e.g., the sensor module 276 or the communication module 290) in volatile memory 232, process the command or the data stored in the volatile memory 232, and store resulting data in non-volatile memory 234. The processor 220 may include a main processor 221 (e.g., a central processing unit (CPU) or an application processor (AP)), and an auxiliary processor 223 (e.g., a graphics processing unit (GPU), an image signal processor (ISP), a sensor hub processor, or a communication processor (CP)) that is operable independently from, or in conjunction with, the main processor 221. Additionally or alternatively, the auxiliary processor 223 may be adapted to consume less power than the main processor 221, or to be specific to a specified function. The auxiliary processor 223 may be implemented as separate from, or as part of the main processor 221.

The auxiliary processor 223 may control at least some of functions or states related to at least one component (e.g., the display device 260, the sensor module 276, or the communication module 290) among the components of the electronic device 201, instead of the main processor 221 while the main processor 221 is in an inactive (e.g., sleep) state, or together with the main processor 221 while the main processor 221 is in an active state (e.g., executing an application). The auxiliary processor 223 (e.g., an image signal processor or a communication processor) may be implemented as part of another component (e.g., the camera module 280 or the communication module 290) functionally related to the auxiliary processor 223.

The memory 230 may store various data used by at least one component (e.g., the processor 220 or the sensor module 276) of the electronic device 201. The various data may include, for example, software (e.g., the program 240) and input data or output data for a command related thereto. The memory 230 may include the volatile memory 232 or the non-volatile memory 234.

The program 240 may be stored in the memory 230 as software, and may include, for example, an operating system (OS) 242, middleware 244, or an application 246.

The input device 250 may receive a command or data to be used by other component (e.g., the processor 220) of the electronic device 201, from the outside (e.g., a user) of the electronic device 201. The input device 250 may include a microphone, a mouse, a keyboard, or a digital pen (e.g., a stylus pen).

The sound output device 255 may output sound signals to the outside of the electronic device 201. The sound output device 255 may include a speaker or a receiver. The speaker may be used for general purposes, such as playing multimedia or playing record, and the receiver may be used for an incoming calls. The receiver may be implemented as separate from, or as part of the speaker.

The display device 260 may visually provide information to the outside (e.g., a user) of the electronic device 201. The display device 260 may include a display, a hologram device, or a projector and control circuitry to control a corresponding one of the display, hologram device, and projector. The display device 260 may include touch circuitry adapted to detect a touch, or sensor circuitry (e.g., a pressure sensor) adapted to measure the intensity of force incurred by the touch.

The audio module 270 may convert a sound into an electrical signal and vice versa. The audio module 270 may obtain the sound via the input device 250, or output the sound via the sound output device 255 or a headphone of an external electronic device (e.g., an electronic device 202) directly (e.g., wiredly) or wirelessly coupled with the electronic device 201.

The sensor module 276 may detect an operational state (e.g., power or temperature) of the electronic device 201 or an environmental state (e.g., a state of a user) external to the electronic device 201, and then generate an electrical signal or data value corresponding to the detected state. The sensor module 276 may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 277 may support one or more specified protocols to be used for the electronic device 201 to be coupled with the external electronic device (e.g., the electronic device 202) directly (e.g., wiredly) or wirelessly. The interface 277 may include a high definition multimedia interface (HDMI), a universal serial bus (USB) interface, a secure digital (SD) card interface, or an audio interface.

A connecting terminal 278 may include a connector via which the electronic device 201 may be physically connected with the external electronic device (e.g., the electronic device 202). The connecting terminal 278 may include a HDMI connector, a USB connector, a SD card connector, or an audio connector (e.g., a headphone connector).

The haptic module 279 may convert an electrical signal into a mechanical stimulus (e.g., a vibration or a movement) or electrical stimulus which may be recognized by a user via his tactile sensation or kinesthetic sensation. The haptic module 279 may include, for example, a motor, a piezoelectric element, or an electric stimulator.

The camera module 280 may capture a image or moving images. According to an embodiment, the camera module 280 may include one or more lenses, image sensors, image signal processors, or flashes.

The power management module 288 may manage power supplied to the electronic device 201. The power management module 288 may be implemented as at least part of a power management integrated circuit (PMIC).

The battery 289 may supply power to at least one component of the electronic device 201. The battery 289 may include, for example, a primary cell which is not rechargeable, a secondary cell which is rechargeable, or a fuel cell.

The communication module 290 may support establishing a direct (e.g., wired) communication channel or a wireless communication channel between the electronic device 201 and the external electronic device (e.g., the electronic device 202, the electronic device 204, or the server 208) and performing communication via the established communication channel. The communication module 290 may include one or more communication processors that are operable independently from the processor 220 (e.g., the application processor (AP)) and supports a direct (e.g., wired) communication or a wireless communication. The communication module 290 may include a wireless communication module 292 (e.g., a cellular communication module, a short-range wireless communication module, or a global navigation satellite system (GNSS) communication module) or a wired communication module 294 (e.g., a local area network (LAN) communication module or a power line communication (PLC) module). A corresponding one of these communication modules may communicate with the external electronic device via the first network 298 (e.g., a short-range communication network, such as Bluetooth™, Wi-Fi direct, or infrared data association (IrDA)) or the second network 299 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 292 may identify and authenticate the electronic device 201 in a communication network, such as the first network 298 or the second network 299, using subscriber information (e.g., international mobile subscriber identity (IMSI)) stored in the subscriber identification module 296.

The antenna module 297 may transmit or receive a signal or power to or from the outside (e.g., the external electronic device) of the electronic device 201. The antenna module 297 may include an antenna including a radiating element composed of a conductive material or a conductive pattern formed in or on a substrate (e.g., printed circuit board (PCB)). The antenna module 297 may include a plurality of antennas. In such a case, at least one antenna appropriate for a communication scheme used in the communication network, such as the first network 298 or the second network 299, may be selected by the communication module 290 (e.g., the wireless communication module 292) from the plurality of antennas. The signal or the power may then be transmitted or received between the communication module 290 and the external electronic device via the selected at least one antenna. Another component (e.g., a radio frequency integrated circuit (RFIC)) other than the radiating element may be additionally formed as part of the antenna module 297.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 201 and the external electronic device 204 via the server 208 coupled with the second network 299. Each of the electronic devices 202 and 204 may be a device of a same type as, or a different type, from the electronic device 201. All or some of operations to be executed at the electronic device 201 may be executed at one or more of the external electronic devices 202, 204, or 208. For example, if the electronic device 201 should perform a function or a service automatically, or in response to a request from a user or another device, the electronic device 201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 201. The electronic device 201 may provide the outcome, with or without further processing of the outcome, as at least part of a reply to the request. To that end, a cloud computing, distributed computing, or client-server computing technology may be used, for example.

Figure 3:
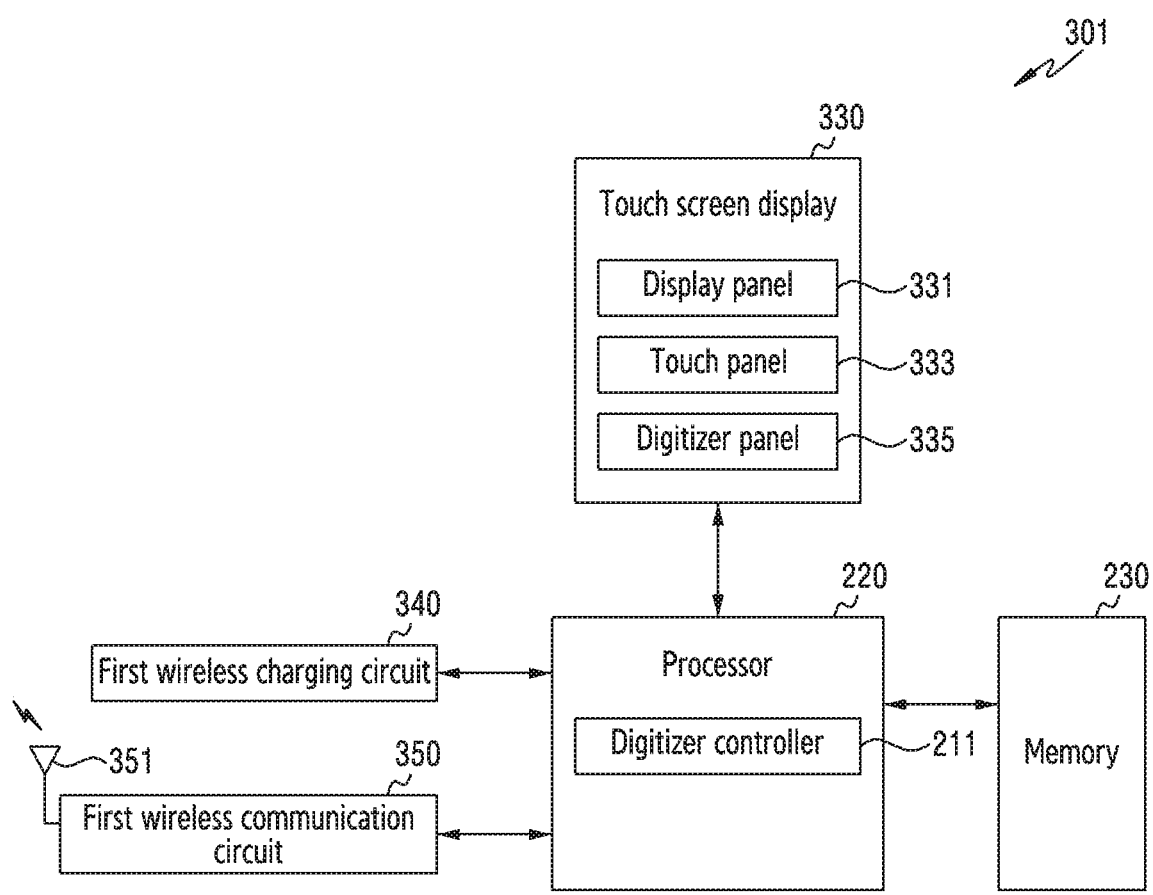
FIG. 3 is a block diagram of an electronic device according to an embodiment of the disclosure.

FIG. 3 is a block diagram of an electronic device according to an embodiment of the disclosure.

Referring to FIG. 3, an electronic device 301 (e.g., the electronic device 20 of FIG. 1 or the electronic device 201 of FIG. 2) according to an embodiment of the disclosure may include a processor 220, a memory 230, a touch-screen display 330 (e.g., a display device 260 of FIG. 2), a first wireless charging circuit 340, and a first wireless communication circuit 350 (e.g., the wireless communication module 292 of FIG. 2).

The processor 220 may control the overall operation of the electronic device 301. For example, the processor 220 may be positioned inside a housing (not shown) of the electronic device 301, and may be operatively (or electrically) connected to the memory 220, the touch-screen display 330, the first wireless charging circuit 340, and the first wireless communication circuit 350 so as to control each element of the electronic device 301.

The processor 220 may include a digitization controller 211. The digitization controller 211 may transmit a position detection signal through a digitization panel 335 and receive a response signal from a resonant circuit of the electronic pen (e.g., the electronic pen 10 of FIG. 1). The digitization controller 211 may determine position information of the electronic pen by analyzing the received response signal. Alternatively, the digitization controller 211 may transmit a detection signal through a coil included in the first wireless charging circuit 340 and receive a signal from the electronic pen so as to identify whether the electronic pen is physically or electrically connected. Alternatively, the digitization controller 211 may charge a battery (or a super capacitor) of the electronic pen by applying a charging signal of a higher voltage compared to the detection signal to the coil of the first wireless charging circuit 340.

The digitization controller 211 may be a separate element. In this case, the processor 220 may perform control to receive insertion information of the electronic pen (e.g., the electronic pen 10 of FIG. 1) from the digitization controller 211, transmit a wireless communication connection command to the first wireless communication circuit 350 on the basis of the received insertion information, and transmit a charging signal and a control signal to the digitization controller 211 on the basis of data received from the first wireless communication circuit 350. A detailed description of the processor 220 will be made below with reference to FIGS. 5A and 5B, 6, 7A and 7B, 8 to 13.

The memory 230 may be operatively (or electrically) connected to the processor 220. The memory 230 may include an Encrypting File System (EFS) area for storage of reference inherent information of the previous connected electronic pen and/or pairing-related data (e.g., bonding data) in the EFS area. The reference inherent information may include a Bluetooth address of the previously connected electronic pen, and the pairing-related data is data generated when pairing is performed, and may include one or more shared secret keys used for a security connection.

The touch-screen display 330 may be exposed through a portion of the housing and may provide an input function and an output function. For example, the touch-screen display 330 may include a display panel 331, a touch panel 333, and a digitization panel 335. The display panel 331 may be embodied as, for example, a Liquid Crystal Display (LCD), a Light-Emitting Diode (LED) display, an Organic Light-Emitting Diode (OLED) display, a Micro Electro Mechanical System (MEMS) display, or an electronic paper display. The touch panel 333 may detect (or recognize) a change in physical characteristics (capacitance or frequency) through various touch input (e.g., tap, double tap, touch, touch movement, or multi-touch) using an input tool (e.g., a finger) and transmit the same to the processor 220. The digitization panel 335 may detect an electromagnetic change in response to input by the electronic pen and transmit the same to the digitization controller 211 of the processor 220. The touch-screen display 330 may further include a pressure detection panel (not shown) for detecting pressure.

The first wireless charging circuit 340 according to an embodiment of the disclosure may be disposed adjacent to a recess (e.g., the recess 22 of FIG. 1) formed inside the housing of the electronic device 301. The first wireless charging circuit 340 may supply power for charging the battery of the electronic pen inserted into the recess. The first wireless charging circuit 340 may be turned on for a first predetermined time (e.g., 9 seconds) and turned off for a second predetermined time (e.g., 1 second) under the control of the processor 220. For example, the processor 220 may perform control to turn on or off the first wireless charging circuit 340 before the battery of the electronic pen is fully charged.

In order to identify (or verify) whether the pen currently connected for communication is the inserted pen, the first wireless charging circuit 340 according to an embodiment of the disclosure may be turned on or off in a predetermined pattern under the control of the processor 220 or the digitization controller 211.

The electronic device 301 may charge the electronic pen through the first wireless charging circuit 340, but the method of charging the electronic pen is not limited to the wireless charging method. For example, the electronic device 301 may charge the electronic pen through an electrically connected charging circuit (e.g., a wired charging circuit).

The first wireless communication circuit 350 may be disposed inside the housing of the electronic device 301, and may connect a wireless communication channel with an external electronic device (e.g., the electronic pen 10 of FIG. 1). The first wireless communication circuit 350 may receive inherent information from the electronic pen through the antenna 351 during or after charging of the electronic pen.

The first wireless communication circuit 350 may support a Bluetooth protocol. For example, the first wireless communication circuit 350 may be a BLE communication circuit. The first wireless communication circuit 350 according to an embodiment of the disclosure may scan for a connectable electronic pen when insertion of the electronic pen is detected or a charging signal is applied. The first wireless communication circuit 350 may receive an advertising signal of the electronic pen. The advertising signal may include charging-related information.

The first wireless charging circuit 340 may be a separate element separated from the electronic device 301. The first wireless charging circuit 340 may establish the communication connection with the electronic device 301 through a server and transmit and receive various data (e.g., charging-related information and/or communication connection state information).

Although not illustrated in FIG. 3, the electronic device 301 may further include at least one other element (e.g., a camera module, an audio module, or a sensor module) equivalent to the aforementioned elements.

Figure 4:
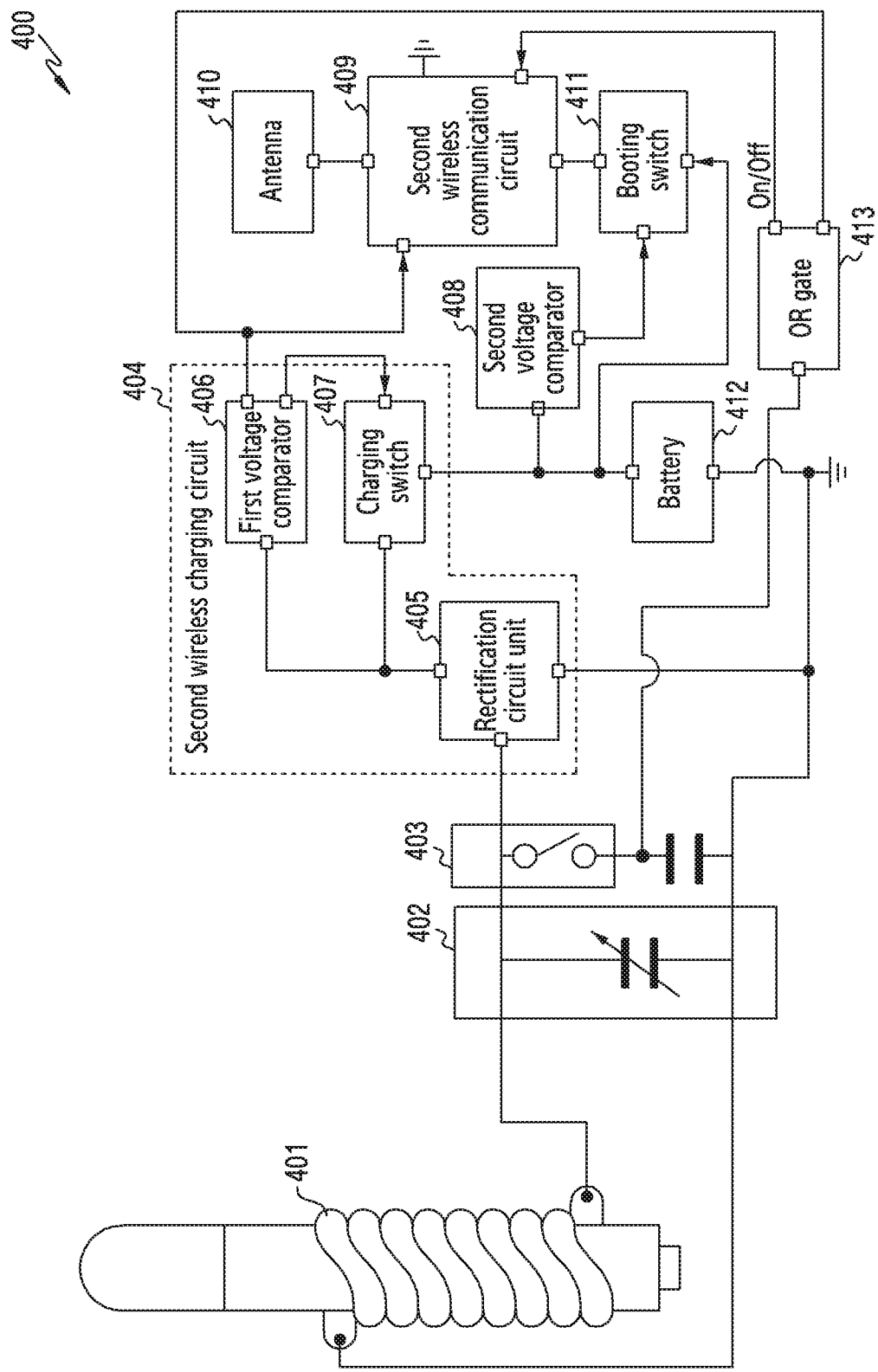
FIG. 4 illustrates the structure of an electronic pen according to an embodiment of the disclosure.

FIG. 4 is a block diagram of an electronic pen according to an embodiment of the disclosure.

Referring to FIG. 4, an electronic pen 400 (e.g., the electronic pen 10 of FIG. 1) according to an embodiment of the disclosure may include a coil 401, a trimmer capacitor 402, a button switch 403, a rectification circuit unit 405, a first voltage comparator 406, a charging switch 407, a second voltage comparator 408, a second wireless communication circuit 409, an antenna 410, a booting switch 411, a battery 412, and an OR gate 413. The rectification circuit unit 405 may be called a first voltage comparator 406, and the charging switch 407 may be called a second wireless charging circuit 404.

The coil 401 may be a resonant circuit that may detect an electromagnetic field signal applied by an external device (e.g., the first wireless charging circuit 340 of the electronic device 10, 201, or 301) and transmit a signal of a specific frequency. For example, the coil 401 may be an Electromagnetic Resonance (EMR) coil. The trimmer capacitor 402 may store an induced current applied to the coil 401. The button switch 403 may detect an input (pressing) of a button positioned at one side of the housing of the electronic pen 400. When the button switch 403 is turned on, the resonant frequency of the coil 401 may be changed. The electronic device may detect a button input through the change in the resonant frequency.

The rectification circuit unit 405 according to an embodiment of the disclosure may convert the alternating current (AC) power applied to the coil 401 into direct current (DC) power and transmit the converted DC power to the first voltage comparator 406 and the charging switch 407.

The first voltage comparator 406 may identify whether the DC power is a position detection signal or a charging signal on the basis of the voltage of the DC power provided from the rectification circuit unit 405. For example, the charging signal may have a value larger than the position detection signal. The first voltage comparator 406 may determine that the DC power is the position detection signal when the DC power is smaller than a reference voltage (e.g., 3 V) and determine that the DC power is the charging signal when the DC power is larger than or equal to the reference voltage. When the DC power provided from the rectification circuit unit 405 is the charging signal, the first voltage comparator 406 may provide the second wireless communication circuit 409 with a signal indicting that the electronic pen 400 is inserted into the electronic device. Further, the first voltage comparator 406 may turn on the charging switch 407 when the DC power is the charging signal, and may turn off the charging switch 407 when the DC power is the position detection signal.

The charging switch 407 may control on/off of charging of the battery 412. For example, the charging switch 407 may provide or block the DC power provided from the rectification circuit unit 405 to the battery 412 on the basis of the output from the first voltage comparator 406.

The electronic pen 400 may charge the battery 412 through the second wireless charging circuit 404, but the method of charging the battery 412 is not limited to the wireless charging method. For example, the electronic pen 400 may charge the battery 412 through a charging circuit (e.g., a wired charging circuit) electrically connected to an external device (e.g., the electronic device).

When the voltage of the battery 412 is larger than or equal to a predetermined voltage, the second voltage comparator 408 according to an embodiment of the disclosure may turn on (boot) the second wireless communication circuit 409.

The second wireless communication circuit 409 may be disposed inside the housing of the electronic pen 400, and may perform wireless communication with the first wireless communication circuit 350 of the external device (e.g., the electronic device 20, 201, or 301). The second wireless communication circuit 409 may support a Bluetooth protocol. For example, the second wireless communication circuit 409 may be a BLE communication circuit.

The second wireless communication unit 409 may transmit state information of the electronic pen 400 (e.g., inherent information or charging-related information) and/or data based on a button input to the first wireless communication circuit through the antenna 410. The antenna 410 may be electrically connected to the second wireless communication circuit 409 and may transmit and receive a wireless signal.

The booting switch 411 may control on/off of the second wireless communication circuit 409. For example, the booting switch 411 may supply or block power of the battery 412 to the second wireless communication circuit 409 on the basis of the output of the second voltage comparator 408.

The battery 412 is a rechargeable secondary cell, may be charged with DC power from the rectification circuit unit 405, and may supply power to the second wireless communication circuit 409. For example, the battery 412 may be a super capacitor.

The OR gate 413 may provide a signal according to OR of the output of the first voltage comparator 404 and the button input to the second wireless communication circuit 409.

According to various embodiments of the disclosure, an electronic device (e.g., the electronic device 10 of FIG. 1, the electronic device 201 of FIG. 2, or the electronic device 301 of FIG. 3) may include a housing (e.g., the housing 21 of FIG. 1), a touch-screen display (e.g., the display device 260 of FIG. 2 or the touch-screen display 330 of FIG. 3) exposed through a portion of the housing, a first wireless communication circuit (e.g., the wireless communication circuit 292 of FIG. 2 or the first wireless communication circuit 350 of FIG. 3) disposed inside the housing, a recess (e.g., the recess 22 of FIG. 1) disposed inside the housing, a first wireless charging circuit (e.g., the first wireless charging circuit 340) disposed inside the housing so as to be adjacent to the recess, an electronic pen (e.g., the electronic pen 10 of FIG. 1 or the electronic pen 400 of FIG. 4) including a second wireless communication circuit (e.g., the wireless communication module 292 of FIG. 2 or the second wireless communication circuit 409 of FIG. 4) inserted to be removable from the recess and capable of performing wireless communication with the first wireless communication circuit and a second wireless charging circuit (e.g., the second wireless charging circuit 404 of FIG. 4) electrically coupled to the first wireless charging circuit, a processor (e.g., the processor 220 of FIG. 2 or 3) located inside the housing and operatively coupled to the display, the first wireless communication circuit, and the first wireless charging circuit, and a memory (e.g., the memory 230 of FIG. 2 or 3) operatively coupled to the processor. The memory may store instructions causing the processor to, when executed, detect whether the electronic pen is inserted into the recess, charge the electronic pen through the first wireless charging circuit based on the detection, receive inherent information of the electronic pen through the first wireless communication circuit during or after charging, and maintain or re-establish a communication connection with the electronic pen based on at least a portion of the received inherent information.

The first wireless communication circuit may support a Bluetooth protocol.

The inherent information may be a Bluetooth address of the electronic pen.

The instructions may cause the processor to store reference inherent information in the memory, compare the received inherent information with the reference inherent information, and maintain or re-establish the communication connection according to a result of the comparison.

The re-establishing of the communication connection may comprise at least one of rebooting of at least one of the first wireless communication circuit and the second wireless communication circuit and deletion of pairing-related data.

The inherent information may be included in an advertising signal of the electronic pen, and the instructions may cause the processor to randomly turn on or off the first wireless charging circuit in response to reception of a plurality of advertising signals from a plurality of electronic pens and maintain or re-establish the communication connection based on whether the advertising signal is synchronized with an on or off pattern of the first wireless charging circuit of the plurality of electronic pens.

The inherent information may be included in an advertising signal of the electronic pen, and the instructions may cause the processor to randomly turn on or off the first wireless charging circuit in response to reception of a plurality of advertising signals from a plurality of electronic pens and maintain or re-establish the communication connection based on whether charging-related information included in the advertising signal is synchronized with an on or off pattern of the first wireless charging circuit of the plurality of electronic pens.

The inherent information may be included in an advertising signal of the electronic pen, and the instructions may cause the processor to make a request for reducing an intensity of the advertising signal of the electronic pen connected for communication to a preset size or smaller in response to reception of a plurality of advertising signals from a plurality of electronic pens, maintain the communication connection with the electronic pen in response to continuous reception of the advertising signal having the reduced signal intensity, and re-establish the communication connection with the electronic pen in response to non-reception of the advertising signal having the reduced signal intensity.

The instructions may cause the processor to provide notification that the electronic pen inserted into the recess has an error when the inherent information is not received.

The instructions may cause the processor to apply charging power to the electronic pen by periodically repeating on and off of the first wireless charging circuit.

The electronic pen may be configured to transmit the advertising signal including the inherent information in an on period of the first wireless charging circuit, not to transmit the advertising signal in an off period of the first wireless charging circuit, to transmit the advertising signal in an on period of the first wireless charging circuit, and stop transmission of the advertising signal after maintaining the transmission of the advertising signal for a predetermined time after turning off of the first wireless charging circuit.

According to various embodiments of the disclosure, an electronic device (e.g., the electronic device 10 of FIG. 1, the electronic device 201 of FIG. 2, or the electronic device 301 of FIG. 3) may comprise a housing (e.g., the housing 21 of FIG. 1); a touch-screen display (e.g., the display device 260 of FIG. 2 or the touch-screen display 330 of FIG. 3) exposed through a portion of the housing; a first wireless communication circuit (e.g., the wireless communication circuit 292 of FIG. 2 or the first wireless communication circuit 350 of FIG. 3) disposed inside the housing; a recess (e.g., the recess 22 of FIG. 1) disposed inside the housing; a first wireless charging circuit (e.g., the first wireless charging circuit 340) disposed inside the housing to be adjacent to the recess; a processor (e.g., the processor 220 of FIG. 2 or 3) located inside the housing and operatively coupled to the display, the first wireless communication circuit, and the first wireless charging circuit; and a memory (e.g., the memory 230 of FIG. 2 or 3) operatively coupled to the processor. The memory stores instructions causing the processor to, when executed, detect whether an electronic pen is inserted into the recess, charge the electronic pen through the first wireless charging circuit based on the detection, perform a scan through the first wireless communication circuit in order to identify information on the electronic pen, turn on or off the first wireless charging circuit in a predetermined pattern in response to discovery of a plurality of electronic pens through the scan, identify the electronic pen inserted into the recess among the plurality of electronic pens based on charging-related information included in advertising signals received from the plurality of found electronic pens, and establish a communication connection with the identified electronic pen.

Figure 5A:
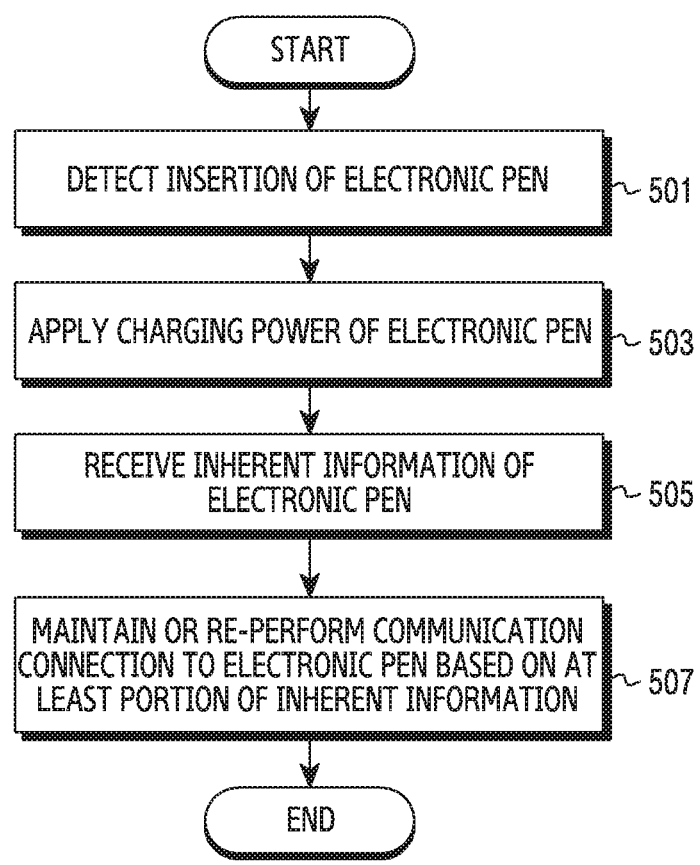
FIG. 5A is a flowchart illustrating a method of controlling a communication connection with an electronic pen by an electronic device according to an embodiment of the disclosure.
Figure 5B:
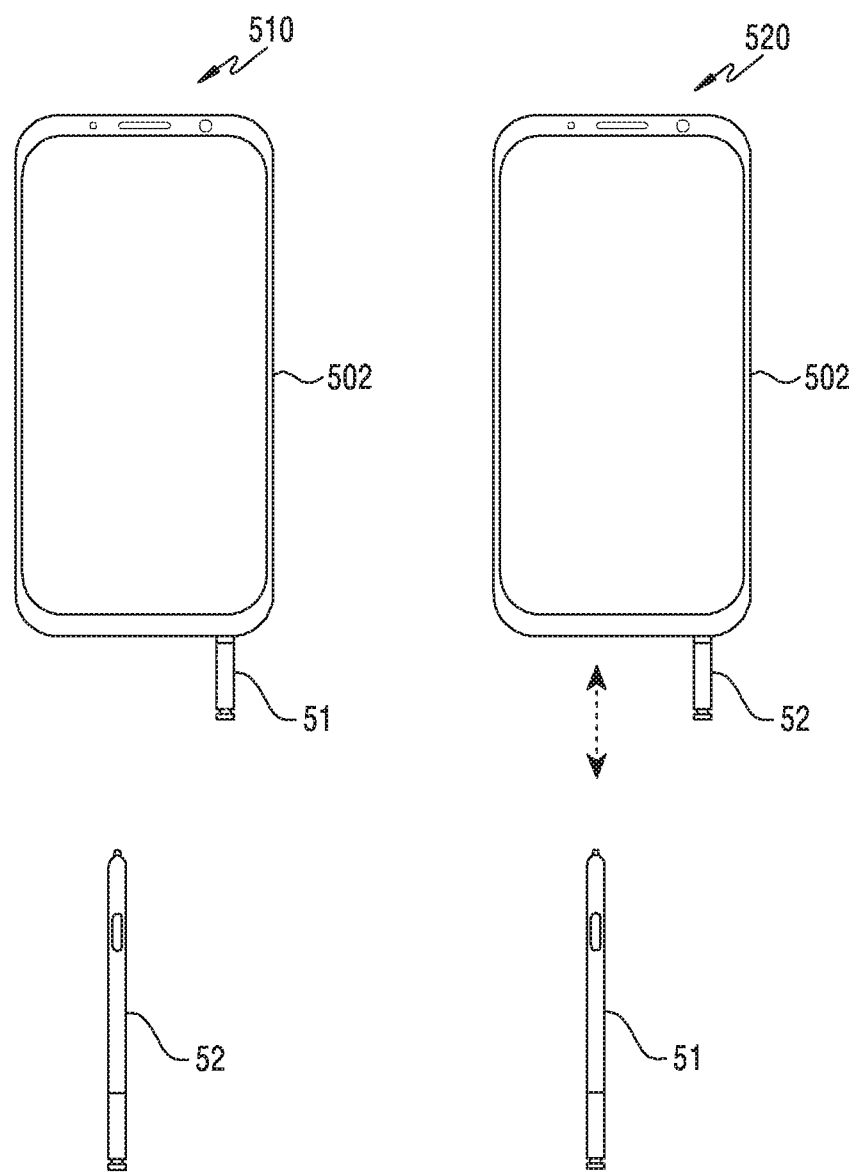
FIG. 5B illustrates a method of controlling a communication connection with an electronic pen by an electronic device according to an embodiment of the disclosure.

FIG. 5A is a flowchart illustrating a method by which an electronic device controls a communication connection with an electronic pen according to an embodiment of the disclosure, and FIG. 5B illustrates an example of a method by which an electronic device controls a communication connection with an electronic pen according to an embodiment of the disclosure.

Referring to FIGS. 5A and 5B, a processor (e.g., the processor 220 of FIG. 2 or the processor 220 of FIG. 3) of an electronic device (e.g., the electronic device 10 of FIG. 1, the electronic device 201 of FIG. 2, or the electronic device 301 of FIG. 3) may detect insertion of an electronic pen (e.g., the electronic pen 10 of FIG. 1 or the electronic 400 of FIG. 4) in operation 501. For example, the processor may detect whether the electronic pen is inserted into a recess (e.g., the recess 22 of FIG. 1) formed inside the housing of the electronic device. The insertion of the electronic pen may be detected through various methods. For example, the processor or the digitization controller 211 may transmit a signal through a detection coil at a predetermined period and identify whether a response signal is received from the electronic pen so as to identify whether the electronic pen is inserted into the electronic device. According to some embodiments, the processor may transmit a signal for calculating the position of the electronic pen at a preset period through a digitization panel (e.g., the digitization panel 335 of FIG. 3) and receive a response signal from the electronic pen. The processor may determine whether the electronic pen is inserted into the electronic device on the basis of position information of the electronic pen recognized through the response. The electronic device may include a separate sensor, an electric switch, or a physical switch for detecting the insertion or removal of the electronic pen.

The processor may apply charging power to the electronic pen in operation 503. For example, the processor may apply charging power to the electronic pen through a first wireless charging circuit (e.g., the first wireless charging circuit 340 of FIG. 3) disposed adjacent to the recess inside the housing. The processor may apply charging power to the electronic pen according to a predetermined time or period. A detailed description thereof will be made below with reference to FIGS. 7A and 7B.

The processor may receive inherent information of the electronic pen in operation 505. For example, the processor may receive inherent information of the electronic pen through a first wireless communication circuit (e.g., the first wireless communication circuit 350 of FIG. 3) during or after charging of the electronic pen. The inherent information may be a device address included in an AdvA field of a payload of the advertising signal, for example, a Bluetooth address.

The processor may maintain or re-establish the communication connection with the electronic pen on the basis of at least a portion of the received inherent information in operation 507. For example, the processor may compare the received inherent information with reference inherent information (e.g., a device address of the electronic pen to which the electronic device performed the communication connection) stored in an Encrypting File System (EFS) area of a memory (e.g., the memory 230 of FIG. 2 or 3), and when the received inherent information matches the reference inherent information, maintain the communication connection with the electronic pen. For example, when a previously paired electronic pen 51 is inserted into an electronic device 502, as indicated by reference numeral 510 of FIG. 5B, the processor may maintain the communication connection with the electronic pen 51.

On the other hand, when the inherent information received from the electronic pen does not match the reference inherent information stored in the EFS area of the memory, the processor may re-establish the communication connection with the inserted electronic pen. For example, when another electronic pen 52, not the electronic pen 51 that previously performed the communication connection, is inserted into the electronic device 502, as indicated by reference numeral 520 of FIG. 5B, the processor may disconnect the communication connection with the electronic pen 51 and re-establish the communication connection with the inserted electronic pen 52. Re-establishing the communication connection may include at least one of rebooting at least one of a first wireless communication circuit (e.g., the first wireless communication circuit 350 of FIG. 3) of the electronic device 502 or a second wireless communication circuit (e.g., the second wireless communication circuit 409 of FIG. 4) of the electronic pen 51, or deletion of pairing-related data.

Figure 6:
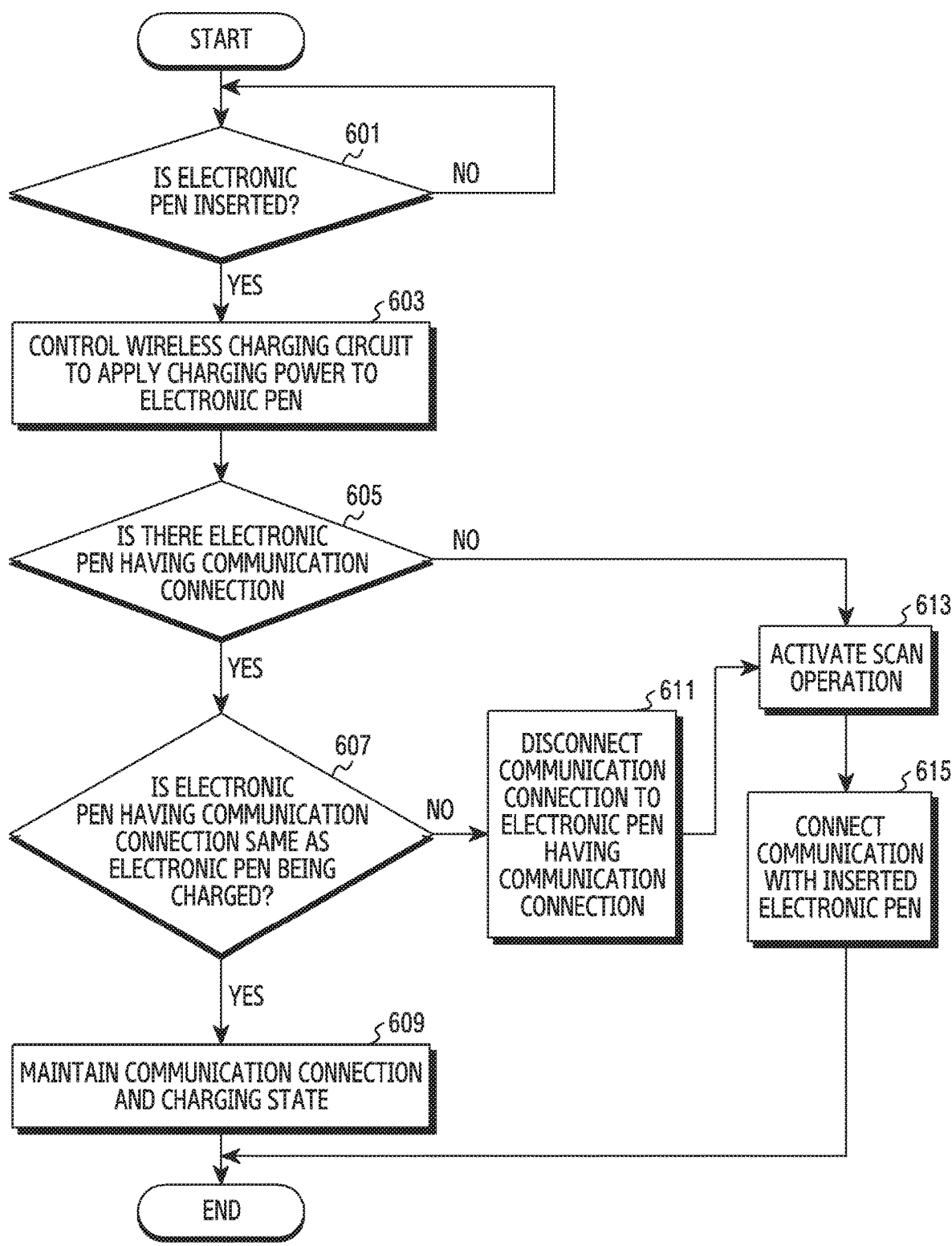
FIG. 6 is a flowchart illustrating a method by which an electronic device controls a communication connection with an electronic pen according to an embodiment of the disclosure.

FIG. 6 is a flowchart illustrating a method by which an electronic device controls the communication connection with an electronic pen according to an embodiment of the disclosure.

Referring to FIG. 6, a processor (e.g., the processor 220 of FIG. 2 or 3) of an electronic device (e.g., the electronic device 10 of FIG. 1, the electronic device 201 of FIG. 2, or the electronic device 301 of FIG. 3) may identify whether insertion (e.g., connection) of an electronic pen (e.g., the electronic pen 10 of FIG. 1 or the electronic pen 400 of FIG. 4) is detected. For example, the processor may identify whether the electronic pen is inserted into a recess (e.g., the recess 22 of FIG. 1) formed inside the electronic device through any of various methods.

When it is determined that the electronic device is not inserted on the basis of the result of the identification in operation 601, the processor may continue to perform operation 601. When it is determined that the electronic pen is inserted on the basis of the result of the identification in operation 601, the processor may perform control so that a wireless charging circuit (e.g., the first wireless charging circuit 340 of FIG. 3) applies charging power to the electronic pen in operation 603. The processor may perform control so that the wireless charging circuit applies charging power to the electronic pen on the basis of a predetermined time period. The method of applying the charging power will be described below with reference to FIGS. 7A and 7B.

When the charging power is applied, the electronic pen may transmit (e.g., broadcast) an advertising signal.

The processor may identify whether there is an electronic pen connected for communication in operation 605. For example, the processor may identify whether there is an electronic pen currently connected for communication with the electronic device on the basis of connection state information of an external device stored in a memory (e.g., the memory 230 of FIG. 2 or 3). When the connection state information of the external device that can be connected to the electronic device is stored in a server (e.g., the server 208 of FIG. 2), the processor may identify the electronic pen through the server. Operation 605 is not limited to being performed after charging power is applied to the electronic pen, but may be performed when insertion of the electronic pen is detected or at a predetermined time.

When it is determined that there is no electronic pen connected for communication on the basis of the result of the identification in operation 605, the processor control to activate a scan operation of a wireless communication circuit (e.g., the first wireless communication circuit 350 of FIG. 3) in operation 613. The scan operation may be a filter scan, but the embodiments of the disclosure are not limited thereto. The processor may search for (or discover) the electronic pen, which can be connected, by activating the scan operation. The scan operation may be an operation for receiving an advertising signal transmitted by the electronic pen. For example, the processor may receive the advertising signal transmitted by the electronic pen through the scan operation.

The processor may activate the scan operation when insertion of the electronic pen is detected.

When an electronic pen connected for communication is discovered on the basis of the result of the identification in operation 605, the processor may identify (verify) whether the electronic pen connected for communication is the same as the electronic pen (inserted pen) that is being charged in operation 607. For example, the processor may identify (verify) whether the electronic pen connected for communication is the same as the electronic pen that is inserted into the electronic device and is being charged on the basis of attribute information indicating the charging state of the electronic pen. A description thereof will be made below with reference to FIGS. 8 and 9.

Whether the electronic pen connected for communication is the same as the electronic pen being charged may be identified by reducing the intensity of the advertising signal of the electronic pen being charged or controlling the intensity of the advertising signal in a predetermined pattern. A detailed description thereof will be made below with reference to FIG. 10.

Whether the electronic pen connected for communication is the same as the electronic pen being charged may be identified by controlling the time at which charging power is applied in an embodiment of the disclosure. This will be described below with reference to FIG. 11.

The electronic device may use a combination of one or more of the various verification methods described above (or described below with reference to FIGS. 8 to 11).

When the electronic pen connected for communication is determined to be the same as the electronic pen being charged on the basis of the result of the identification in operation 607, the processor may maintain the communication connection and the charging state in operation 609.

When the electronic pen connected for communication is determined not to be the same as the electronic pen being charged on the basis of the result of the identification in operation 607, for example, when communication with an electronic pen located outside the electronic device is connected, the processor may disconnect the communication connection with the electronic pen connected for communication in operation 611 and proceed to operation 613.

Before performing operation 613 (the scan operation), the processor may initialize the inserted electronic pen. The initialization may include rebooting of a wireless communication circuit (e.g., the second wireless communication circuit 409 of FIG. 4) within the electronic pen, deletion of pairing-related data, or disconnection. The initialization may be performed using a charging signal. For example, the processor may apply a charging signal to the inserted electronic pen for a predetermined time or longer for initialization of the electronic pen. The electronic pen receiving the charging signal for the predetermined time or longer from the electronic device may perform the initialization operation. After the initialization is completed, the electronic pen may transmit the advertising signal and the electronic device may perform a scan.

The processor may control so that the wireless communication circuit connects for communication with the inserted electronic pen in operation 615. For example, when the inserted electronic pen is found through the scan operation of the wireless communication circuit, the processor may establish the communication connection with the inserted electronic pen through the wireless communication circuit. At this time, the inserted electronic pen may be in a charging state through charging power applied in operation 603. When a plurality of advertising signals is received through the scan operation, the processor may perform a verification procedure by combining one or more of the various verification methods described above (or described below with reference to FIGS. 8 to 11) in order to identify (select) the electronic pen currently inserted into the electronic device. Alternatively, when no electronic pen is found after the scan is completed, the processor may again perform the scan operation a predetermined number of times (e.g., three times). The processor may output a screen inquiring about whether to again perform the scan on a display (e.g., the display device 260 of FIG. 2) and again perform the scan or cancel the scan operation according to the user's selection. When no electronic pen is found after the scan is completed or the rescan is performed a predetermined number of times, the processor may notify the user of an error of the electronic device or the electronic pen.

Figure 7A:
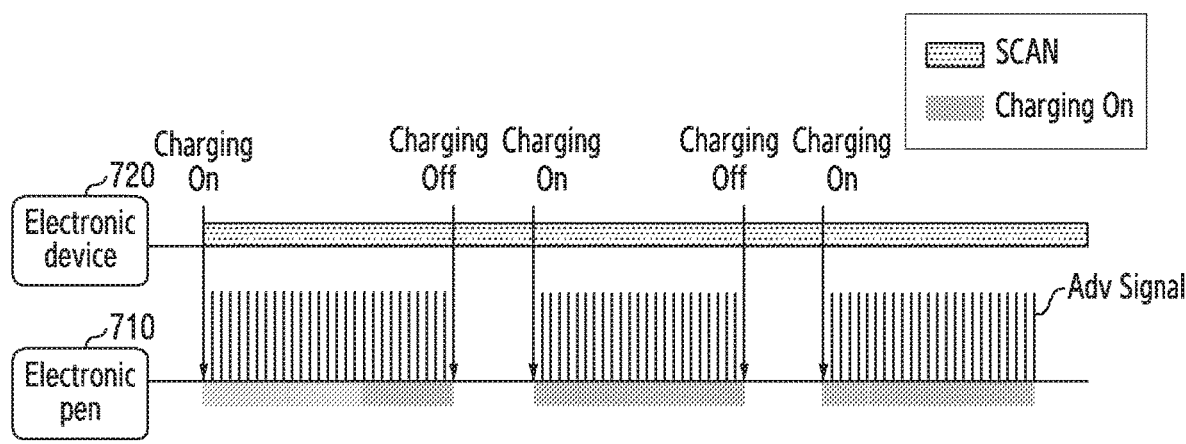
FIG. 7A illustrates the application of charging power and a transmission period of an advertising signal of an electronic pen according to an embodiment of the disclosure.
Figure 7B:
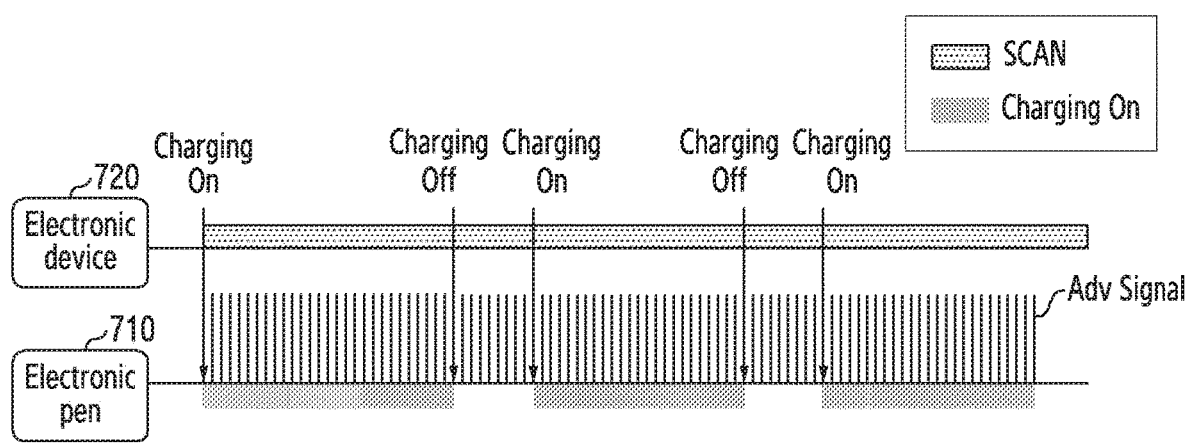
FIG. 7B illustrates the application of charging power and a transmission period of an advertising signal of an electronic pen according to an embodiment of the disclosure.

FIG. 7A illustrates the application of charging power and a transmission period of an advertising signal of an electronic pen according to an embodiment of the disclosure, and FIG. 7B illustrates the application of charging power and a transmission period of an advertising signal of an electronic pen according to an embodiment of the disclosure.

Referring to FIGS. 7A and 7B, when insertion of an electronic pen 710 (e.g., the electronic pen 10 of FIG. 1 or the electronic pen 400 of FIG. 4) is detected, a processor (e.g., the processor 220 of FIG. 2 or FIG. 3) of an electronic device 720 (e.g., the electronic device 20 of FIG. 1, the electronic device 201 of FIG. 2, or the electronic device 301 of FIG. 3) may apply charging power to the electronic pen 710 by controlling a wireless charging circuit (e.g., the first wireless charging circuit 340 of FIG. 3). For example, when the electronic pen 710 is inserted into the electronic device 720, as illustrated in FIG. 7A, the processor may repeat an operation for controlling the wireless charging circuit to apply charging power to turn on charging for a first predetermined time (e.g., 9 seconds) and controlling the wireless charging circuit not to apply charging power (to turn off charging) for a second predetermined time (e.g., 1 second). Meanwhile, as illustrated in FIG. 7A, the electronic pen 710 may transmit the advertising signal while charging is performed (while charging is on), and when charging ends (charging is off), may stop transmission of the advertising signal. For example, the electronic pen 710 may be configured to transmit the advertising signal during an on period of the wireless charging circuit and not to transmit the advertising signal during an off period of the wireless charging circuit.

The processor may add an electronic pen scanned for (found) at the on period of the wireless charging circuit to a candidate list. On the other hand, the processor may add an electronic pen scanned for (found) at the off period of the wireless charging circuit to a blacklist. The electronic pen added to the blacklist may be removed from the candidate list of the inserted electronic pen. This operation may be repeated until only one electronic pen is left in the candidate list.

In order to prevent misrecognition of the charging state of the electronic pen during the charging off period, in which charging power is not applied even though charging has not actually ended, the electronic pen may transmit the advertising signal while charging is performed, maintain transmission of the advertising signal for a third predetermined time (e.g., 1 second) after charging ends, and stop transmission of the advertising signal after the third predetermined time passes, as illustrated in FIG. 7B. The third predetermined time may be set as a value larger than or equal to the second predetermined time. When the third predetermined time is configured to be longer than or equal to the second predetermined time, as described above, charging is turned on after the second predetermined time, so that the advertising signal may be transmitted at the charging on period and the charging off period.

When charging power is applied from the electronic device after the electronic pen is inserted, the electronic pen may charge the battery and identify the power (e.g., a voltage) of the battery, and when the power (voltage) of the battery satisfies a preset condition (e.g., higher than or equal to 10% of full power), transmit the advertising signal. The electronic pen may transmit the advertising signal including state information indicating that the electronic pen is being charged. The electronic pen may change the state information included in the advertising signal so as to indicate that charging is off after the third predetermined time passes. Even though the electronic pen is actually in the charging off state between the charging off and the third predetermined time, the electronic pen may transmit the advertising signal including state information indicating a charging on state.

Figure 8:
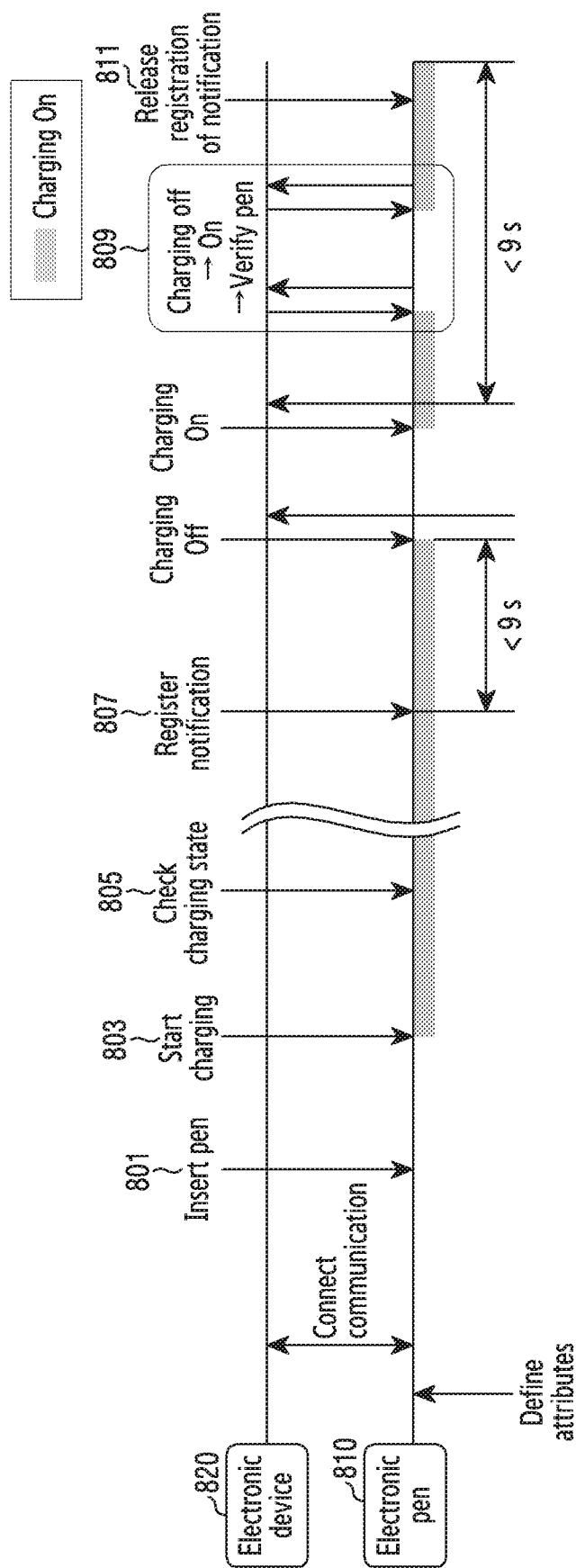
FIG. 8 illustrates a method of verifying whether an electronic pen connected for communication is the same as an electronic pen being charged according to an embodiment of the disclosure.

FIG. 8 illustrates a method of verifying whether the electronic pen connected for communication is the same as the electronic pen being charged according to an embodiment of the disclosure.

Referring to FIG. 8, an electronic device 820 (e.g., the electronic device 20 of FIG. 1, the electronic device 201 of FIG. 2, or the electronic device 301 of FIG. 3) according to an embodiment of the disclosure may verify (identify) whether the electronic pen 810 (e.g., the electronic pen 10 of FIG. 1 or the electronic pen 400 of FIG. 4) connected for communication is the same as the electronic pen which is inserted and being charged. For example, the electronic device 820 may perform the verification by identifying attribute information indicating the charging state of the electronic pen through a notification. Hereinafter, the case in which the electronic pen 810 connected for communication is inserted into the electronic device 820 will be described by way of example.

When the electronic device 820 receives an insertion event of the electronic pen 810 as indicated by reference numeral 801, the electronic device 820 may apply a charging signal to the electronic pen 810, as indicated by reference numeral 803 and read attribute information indicating a charging state so as to check the charging state, as indicated by reference numeral 805. At this time, the inserted electronic pen 810 may be using a high slave latency value to operate with low power and may exchange a signal with the electronic device 820 at a period shorter than the slave latency in case of receiving a read command of the electronic device 820 when the charging signal is applied.

When the electronic pen 810 connected for communication to the electronic device 820 does not respond to the read command within a predetermined time or when a response indicating that charging is being performed is received, the electronic device 820 may consider that the electronic pen 810 connected for communication is different from the electronic pen inserted into a recess (e.g., the recess 22 of FIG. 1) of the electronic device 820.

On the other hand, when a response indicating the electronic pen 810 connected for communication is being charged is received, the electronic device may verify whether the electronic pen 810 connected for communication is the same as the electronic pen being charged. This is performed because, if the determination is performed on the basis only of charging state information, when the electronic pen 810 connected for communication is inserted into another electronic device in the vicinity (within a communication range of the electronic device) and is being charged, the electronic pen 810 connected for communication is mistaken for the electronic pen inserted into the electronic device 820 even though the electronic pens are different from each other.

The electronic device 820 may register a notification in attribute information indicating the charging state of the electronic pen, as indicated by reference numeral 807, turn off and then turn on the charging signal in a predetermined pattern during the charging on period, as indicated by reference numeral 809, and identify whether the attribute information is synchronized and changed through the notification. When an on/off change of the charging signal is the same as the change in attribute information indicating the charging state received through the notification, or when the attribute information is synchronized, the electronic device may determine that the electronic pen 810 connected for communication is the same as the electronic pen that is inserted and being charged. When the changes are not the same, the electronic device may determine that the electronic pen connected for communication is different from the electronic pen that is inserted and being charged. When the verification is completed, the processor may release the registration of the notification, as indicated by reference numeral 811.

According to some embodiments, when the number of electronic pens having a charging state change which is the same as the on/off pattern of the charging signal is plural, the electronic device 820 may change the on/off pattern of the charging signal and repeat the verification process until only one electronic pen is detected.

The electronic device may register the notification when the communication connection with the electronic pen is established.

In order to maintain a low-power state, the electronic pen may prevent a response delay of the electronic pen that may be generated due to the use of a high slave latency value. When the charging signal is applied, the electronic pen may perform communication at a predetermined period (e.g., a BLE connection interval or a separately configured interval) shorter than the slave latency for a predetermined time or a charging time regardless of the slave latency in order to rapidly share the charging state of the electronic pen. Accordingly, it is possible to prevent the delay of sharing of the charging state due to the high slave latency value in embodiments of the disclosure.

Figure 9:
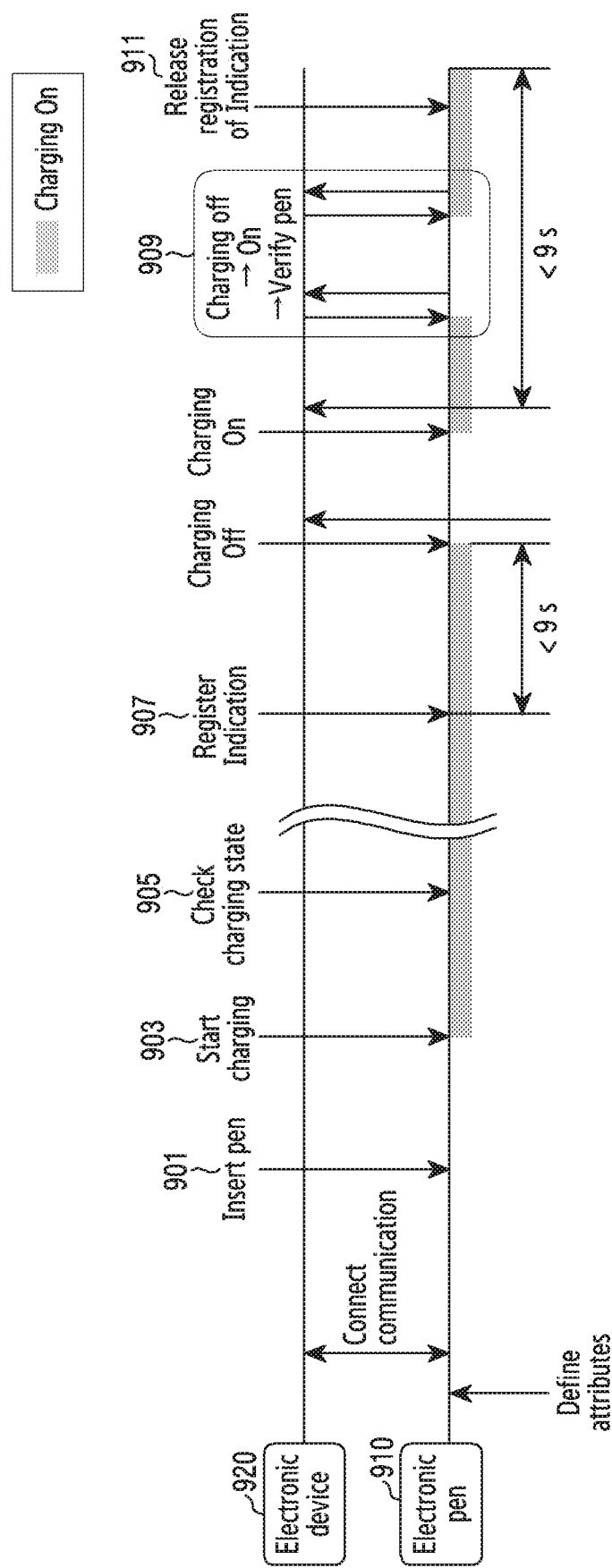
FIG. 9 illustrates a method of verifying whether an electronic pen connected for communication is the same as an electronic pen being charged according to an embodiment of the disclosure.

FIG. 9 illustrates a method of verifying whether the electronic pen connected for communication is the same as the electronic pen being charged according to an embodiment of the disclosure.

Referring to FIG. 9, an electronic device 920 according to an embodiment of the disclosure may identify whether the electronic pen 910 connected for communication is the same as the electronic pen that is inserted and being charged through an indication. For example, when the electronic device 920 receives an insertion event of the electronic pen 910 connected for communication, as indicated by reference numeral 901, the electronic device 920 may apply a charging signal to the inserted electronic pen 910, as indicated by reference numeral 903, and read attribute information indicating a charging state so as to check the charging state, as indicated by reference numeral 905.

The electronic device 920 may register an indication in attribute information indicating the charging state of the electronic pen, as indicated by reference numeral 907, and perform verification by turning on/off the charging signal in a predetermined pattern at a charging on period, as indicated by reference numeral 909. When the predetermined off/on pattern of the charging signal is the same as the change pattern of the attribute information indicating the charging state received through the indication, the electronic device may determine that the electronic pen 910 connected for communication is the same as the electronic pen that is inserted and being charged. When the number of electronic pens having a charging state change the same as the predetermined off/on pattern of the charging signal is plural, the electronic device 920 may change the off/on pattern of the charging signal and repeat the verification process until only one electronic pen is detected. When the change patterns are not the same as each other, the electronic device may determine that the electronic pen connected for communication is different from the electronic pen that is inserted and being charged. When the verification is completed, the processor may release the registration of the indication, as indicated by reference numeral 911.

When the electronic device 920 does not receive a response signal of a read command from the electronic pen 910 connected for communication within a predetermined time, or when a response indicating that charging is not being performed is received, the electronic device 920 may determine that the electronic pen 910 connected for communication is different from the electronic pen inserted into the electronic device 920.

The electronic pen 910 may share the charging state with the electronic device using a high slave latency value for operation with low power. According to some embodiments, in order to rapidly share the charging state with the electronic device, the electronic pen 910 may exchange a signal with the electronic device 920 at a shorter period than the slave latency when the charging is applied.

Figure 10:
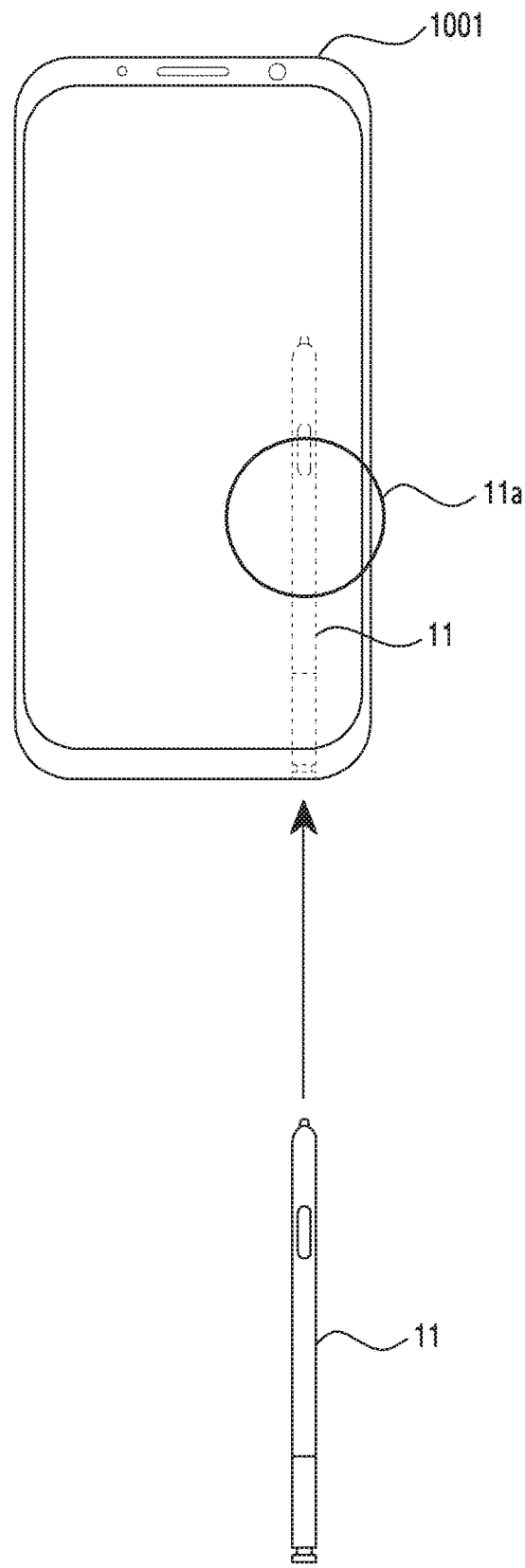
FIG. 10 illustrates a method of verifying whether an electronic pen connected for communication is the same as an electronic pen being charged according to an embodiment of the disclosure.

FIG. 10 illustrates a method of verifying whether the electronic pen connected for communication is the same as the electronic pen being charged according to an embodiment of the disclosure.

Referring to FIG. 10, it is possible to verify whether the electronic pen connected for communication is the same as the electronic pen being charged by reducing the intensity of the advertising signal to a predetermined magnitude according to an embodiment. For example, when the electronic pen 11 is inserted into an electronic device 1001 and charging power is applied, the electronic pen 11 may transmit the advertising signal having an intensity within a predetermined range 11*a*, as illustrated in FIG. 10. When the electronic pen 11 is inserted into the electronic device 1001, the predetermined range 11*a* may be set as the minimum range within which an antenna (e.g., the antenna 351 of FIG. 3) of a wireless communication circuit (e.g., the first wireless communication circuit 350) of the electronic device 1001 is capable of detecting the advertising signal. Accordingly, the electronic device 1001 may not receive an advertising signal transmitted by an electronic pen inserted into another electronic device, not the electronic pen 11 inserted into the electronic device 1001 itself, or may receive the advertising signal with a very low signal intensity.

A processor (e.g., the processor 220 of FIG. 2 or 3) of the electronic device 1001 may verify whether the electronic pen connected for communication is the same as the electronic pen being charged by controlling the intensity of the advertising signal of the electronic pen 11. For example, the processor may control the electronic pen connected for communication so as to transmit the advertising signal having intensity reduced to a predetermined intensity or lower when the electronic pen is inserted. When the advertising signal is continuously received after the intensity of the advertising signal is reduced, the processor may determine that the electronic pen connected for communication is the same as the electronic pen that is inserted into the electronic device and is being charged. On the other hand, when the advertising signal is not received after the intensity of the advertising signal is reduced, the processor may determine that the electronic pen connected for communication is inserted into another electronic device or is located outside the electronic device 1001.

When a plurality of advertising signals is received even after the signal of the advertising signal is reduced, the processor of the electronic device may perform control to reduce the intensity of the advertising signal by a predetermined amount until one advertising signal is received. In another example, the processor may recognize the advertising signal of the inserted electronic pen among the plurality of advertising signals by controlling a charging time (e.g., increasing the time to 9.3 seconds).

The processor of the electronic device may control the intensity of the advertising signal according to a predetermined pattern, identify whether the intensity of the received signal is changed in accordance with the predetermined pattern, and verify whether the electronic pen connected for communication is the same as the electronic pen being charged.

It is possible to recognize the inserted electronic pen by increasing the intensity of the advertising signal. For example, the processor of the electronic device may recognize that the electronic pen transmitting the advertising signal having an intensity higher than a predetermined advertising signal intensity is the inserted electronic pen.

Figure 11:
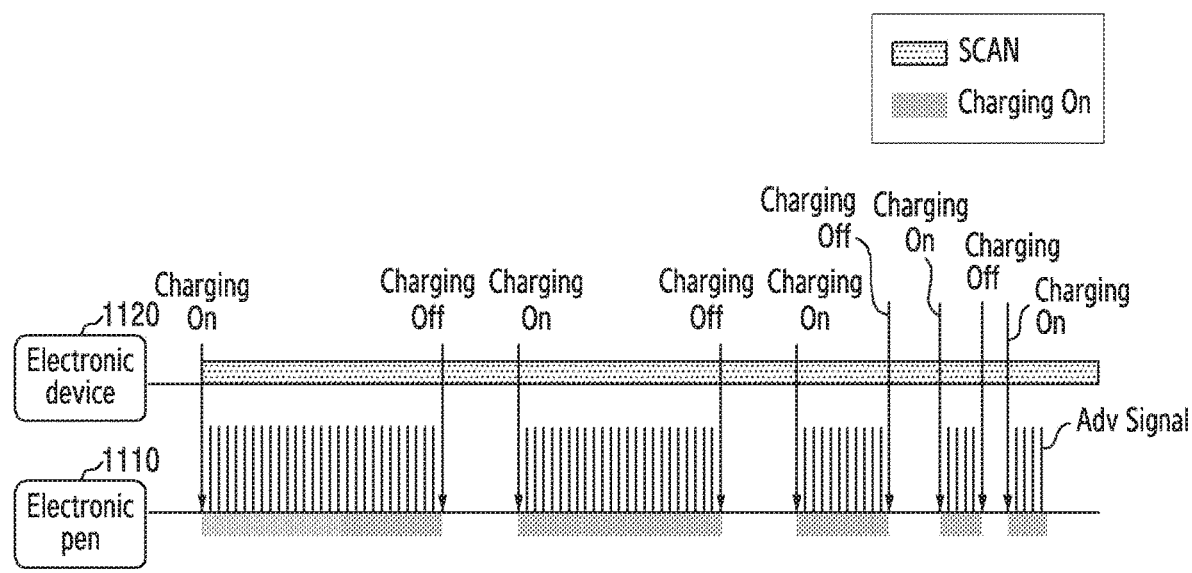
FIG. 11 illustrates a method of verifying whether an electronic pen connected for communication is the same as an electronic pen being charged according to an embodiment of the disclosure.

FIG. 11 illustrates a method of verifying whether the electronic pen connected for communication is the same as the electronic pen being charged according to an embodiment of the disclosure.

Referring to FIG. 11, an electronic device 1120 (e.g., the electronic device 20 of FIG. 1, the electronic device 201 of FIG. 2, or the electronic device 301 of FIG. 3) according to an embodiment of the disclosure may verify whether the electronic pen connected for communication is the same as the electronic pen being charged by controlling an application time of charging power. For example, if an electronic pen 1110 (e.g., the electronic pen 10 of FIG. 1 or the electronic pen 400 of FIG. 4) is configured to transmit the advertising signal only when the electronic pen 1110 is being charged, the electronic device 1120 may turn on/off a charging signal in a predetermined pattern at a charging period, and when the received advertising signal corresponds to (e.g., is synchronized with) on/off of the charging signal, determine that the electronic pen 1110 connected for communication is the same as the electronic pen being charged.

When the electronic pen 1110 transmits the advertising signal including charging-related information, the electronic device 1120 may turn on/off the charging signal according to a predetermined pattern, and when the charging-related information included in the received advertising signal corresponds to (is synchronized with) the predetermined pattern, determine that the electronic pen 1110 connected for communication is the same as the electronic pen being charged. When the number of electronic pens having charging-related information that is the same as the predetermined on/off pattern of the charging signal is plural, the electronic device 1120 may change the predetermined on/off pattern of the charging signal and repeat the verification process until only one electronic pen is detected.

When the electronic pen 1110 is configured to transmit charging-related information to the electronic device 1120 connected for communication, the electronic device 1120 may turn on/off the charging signal in a predetermined pattern, and when the charging-related information included in the signal transmitted by the electronic pen 1110 connected for communication corresponds to (is synchronized with) the predetermined pattern, determine that the electronic pen 1110 connected for communication is the same as the electronic pen being charged.

Figure 12:
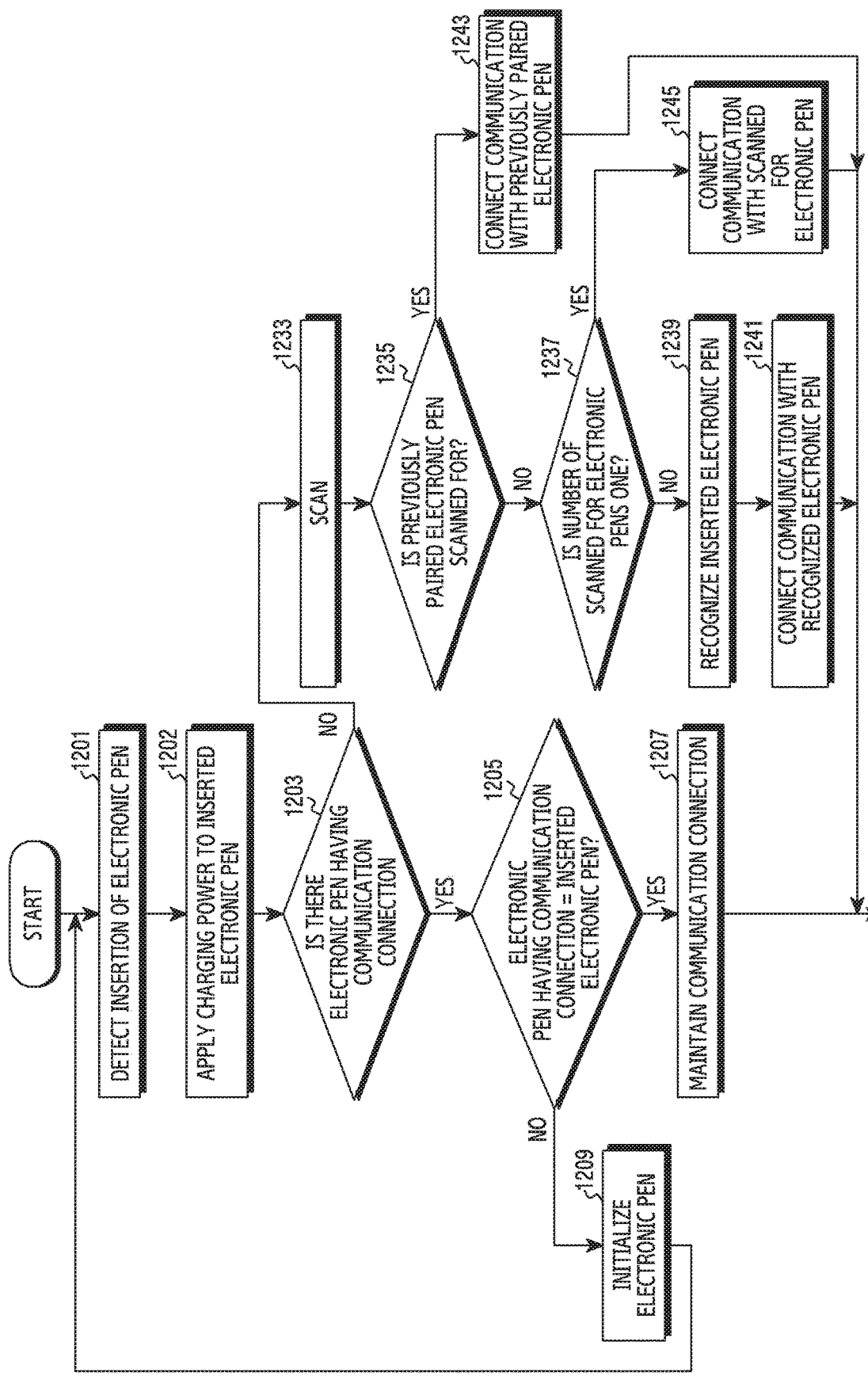
FIG. 12 is a flowchart illustrating a method by which an electronic device controls a communication connection with an electronic pen according to an embodiment of the disclosure.

FIG. 12 is a flowchart illustrating a method by which an electronic device controls a communication connection with an electronic pen according to an embodiment of the disclosure.

Referring to FIG. 12, a processor (e.g., the processor 220 of FIG. 3) of an electronic device (e.g., the electronic device 10 of FIG. 1, the electronic device 201 of FIG. 2, the electronic device 301 of FIG. 3, the electronic device 502 of FIG. 5B, the electronic device 720 of FIGS. 7A and 7B, the electronic device 820 of FIG. 8, the electronic device 920 of FIG. 9, the electronic device 1001 of FIG. 10, or the electronic device 1120 of FIG. 11) according to an embodiment of the disclosure may detect insertion of an electronic pen (e.g., the electronic pen 10 of FIG. 1, the electronic pen 400 of FIG. 4, the electronic pen 51 or 52 of FIG. 5B, the electronic pen 710 of FIGS. 7A and 7B, the electronic pen 810 of FIG. 8, the electronic pen 910 of FIG. 9, the electronic pen 11 of FIG. 10, or the electronic pen 1110 of FIG. 11) in operation 1201.

When insertion of the electronic pen is detected, the processor may control a wireless charging circuit (e.g., the first wireless charging circuit 340 of FIG. 3) to apply charging power to the inserted electronic pen in operation 1202. Since a method of applying the charging power has been described with reference to FIGS. 7A and 7B, a detailed description thereof is omitted. The electronic pen to which the charging power is applied may output an advertising signal.

The processor may identify whether there is an electronic pen connected for communication in operation 1203.

When an electronic pen connected for communication is discovered on the basis of the result of identification in operation 1203, the processor may identify whether the electronic pen connected for communication is the same as the inserted electronic pen in operation 1205. For example, when an electronic pen is connected for communication, the processor may not activate a scan mode but may identify whether the electronic pen connected for communication is the same as the inserted electronic pen through the various methods described with reference to FIGS. 8 to 11. When the electronic device is capable of simultaneously establishing communication connections with each of a plurality of electronic pens, the processor may activate the scan even though an electronic pen is already connected for communication. In this case, the processor may identify whether the electronic pen connected for communication is the same as the inserted electronic pen by comparing reference inherent information of the electronic pen connected for communication with inherent information included in the advertising signal transmitted by the inserted electronic pen.

When the electronic pen connected for communication is determined to be the same as the inserted electronic pen on the basis of the result of identification in operation 1205, the processor may maintain the communication connection in operation 1207. On the other hand, when the electronic pen connected for communication is determined not to be the same as the inserted electronic pen on the basis of the result of identification in operation 1205, the processor may initialize the inserted electronic pen in operation 1209.

The processor may notify the user that another electronic pen is inserted before performing operation 1209. The processor may alternately notify the user that the electronic pen is changed after operation 1209. For example, the processor may notify the user of insertion of another electronic pen or a change of the electronic pen through a visual method (e.g., output of a popup message on the display), an auditory method (e.g., output of an audio signal through a speaker), or a tactile method (e.g., output of vibration of a predetermined pattern through a vibration motor).

The processor may display a popup message inquiring about whether to change the electronic pen on the display before operation 1209 and perform operation 1209 in response to reception of user input making a request for changing the electronic pen. The processor may terminate the communication connection procedure in response to reception of user input requesting that the electronic pen not be changed.

The processor may maintain the communication connection with the electronic pen connected for communication before operation 1209 and notify the user that another electronic pen has been inserted. Maintaining the communication connection with the electronic pen means that the electronic pen connected for communication is located near the electronic device, and this is because the user can easily replace the electronic pen inserted into the electronic device with the electronic pen. When establishment of the communication connection with the electronic pen connected for communication is released before the user replaces the electronic pen, the processor may perform operation 1209.

When it is determined that there is no electronic pen connected for communication on the basis of the result of identification in operation 1203, the processor may control the wireless communication circuit (e.g., the first wireless communication circuit 350 of FIG. 3) to scan for the electronic pen in operation 1233. For example, the processor may receive an advertising signal transmitted by at least one electronic pen in the vicinity by controlling the wireless communication circuit.

The processor may identify whether a previously paired electronic pen is found in operation 1235. For example, the processor may identify whether a previously paired electronic pen is included in at least one currently found electronic pen by comparing reference inherent information stored in the memory with inherent information included in at least one received advertising signal.

When the previously paired electronic pen is included in at least one electronic pen found on the basis of the result of identification in operation 1235, the processor may connect for communication with the previously paired electronic pen in operation 1243. This is because the user seldom changes an electronic pen that has been used. However, the embodiments of the disclosure are not limited thereto. For example, when a new electronic pen is inserted into the electronic device and the electronic pen that the user used (e.g., the previously paired electronic pen) is inserted into another nearby electronic device, a problem may occur with the communication connection with the previously paired electronic pen. In order to prevent this problem, a verification procedure for identifying whether the inserted electronic pen is the previously paired electronic pen through the various methods described with reference to FIG. 11 may be performed.

On the other hand, when the previously connected electronic pen is not included in the at least one electronic pen found on the basis of the result of identification in operation 1235, the processor may identify whether the number of found electronic pens is one in operation 1237. When one electronic pen is found on the basis of the result of identification in operation 1237, the processor may connect for communication with the one found electronic pen in operation 1245. The processor may perform a verification procedure for identifying whether the one found electronic pen is the same as the inserted electronic pen through the various methods described with reference to FIG. 11. This is because one electronic pen inserted into another electronic device or one electronic pen located outside the electronic device may be found when a broken electronic pen is inserted into the electronic device.

When the number of found electronic pens is determined not to be one on the basis of the result of identification in operation 1237, for example, when the number of found electronic pens is two or more, the processor may recognize (determine or select) the electronic pen inserted into the electronic device from among the plurality of electronic pens in operation 1239. For example, the processor may recognize the electronic pen actually inserted into the electronic device through the various methods described with reference to FIG. 11.

The processor may connect for communication with the recognized electronic pen in operation 1241.

Although not illustrated, when no electronic pen is found on the basis of the result of the scan in operation 1233, the processor may notify the user of breakdown of the electronic pen. According to some embodiments, when no electronic pen is found, the processor may initialize the inserted electronic pen and perform the scan operation again. This is because the electronic pen inserted into the electronic device is connected for communication with another electronic device and thus may not be found when the scan is performed.

Figure 13:
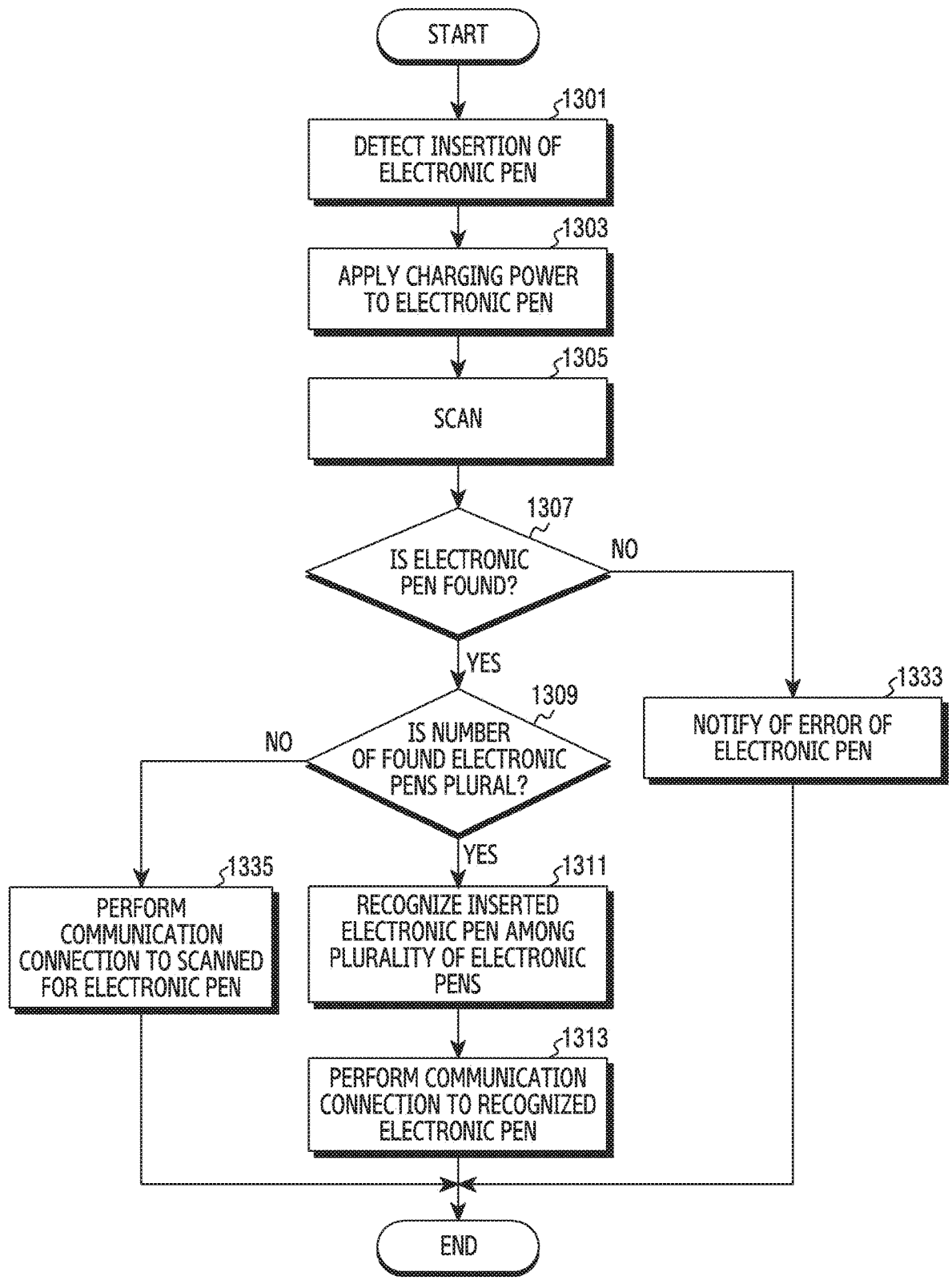
FIG. 13 is a flowchart illustrating a method by which an electronic device controls the communication connection with an electronic pen according to an embodiment of the disclosure.

FIG. 13 is a flowchart illustrating a method by which an electronic device controls the communication connection with an electronic pen according to an embodiment of the disclosure.

Referring to FIG. 13, a processor (e.g., the processor 220 of FIG. 2 or 3) of an electronic device (e.g., the electronic device 10 of FIG. 1, the electronic device 201 of FIG. 2, the electronic device 301 of FIG. 3, the electronic device 502 of FIG. 5B, or the electronic device 1001 of FIG. 10) may detect insertion of an electronic pen in operation 1301. The insertion of the electronic pen may be detected through any of various methods. Since a detailed description thereof has been made above, the description will be omitted.

The processor may control a wireless charging circuit (e.g., the first wireless charging circuit 340 of FIG. 3) to apply charging power to the inserted electronic pen in operation 1303. Since a method of applying the charging power has been described with reference to FIGS. 7A and 7B, a detailed description thereof is omitted. The electronic pen to which the charging power is applied may output an advertising signal.

The processor may scan for at least one electronic pen by controlling the wireless communication circuit (for example, the first wireless communication circuit 350 of FIG. 3) in operation 1305. For example, the processor may receive an advertising signal transmitted by at least one electronic pen through the wireless communication circuit.

The processor may identify whether an electronic pen is found in operation 1307. When an electronic pen is found on the basis of the result of identification in operation 1307, the processor may identify whether the number of found electronic pens is two or more in operation 1309.

When the number of found electronic pens is two or more on the basis of the result of identification in operation 1309, the processor may recognize an inserted electronic pen among the plurality of found electronic pens in operation 1311. For example, the processor may recognize (determine/select) the electronic pen actually inserted into the electronic device through the various methods described with reference to FIG. 11.

The processor may establish the communication connection with the recognized electronic pen in operation 1313.

When no electronic pen is found on the basis of the result of identification in operation 1307, the processor may provide notification of an error of the electronic pen in operation 1333. For example, the processor may output a popup message to the display, output a predetermined audio signal through a speaker, or output a vibration in a predetermined pattern through a vibration motor.

The processor may initialize the inserted electronic pen before providing notification of the error of the electronic pen and perform the scan operation again. This is because the electronic pen inserted into the electronic device is connected for communication with another electronic device and thus may not be found.

When the number of electronic pens is not plural on the basis of the result of identification in operation 1309, for example, when the number of found electronic pens is one, the processor may establish the communication connection with the found electronic pen in operation 1335. For example, the processor may determine that the one found electronic pen is the electronic pen inserted into the electronic device and establish the communication connection. The processor may perform a verification procedure for identifying whether the one found electronic pen is the inserted electronic pen through the various methods described with reference to FIG. 11. This is because one electronic pen inserted into another electronic device or one electronic pen located outside the electronic device may be found while the broken electronic pen is inserted into the electronic device.

Although the above description has been made on the basis of the case in which the electronic pen is inserted, the electronic device may perform the operation for the communication connection with the electronic pen in various states requiring the communication connection with the electronic pen, for example, when an application (or an app) using the electronic pen is executed, when the application (e.g., the app) is terminated from the memory due to an error and then executed again, or when the communication connection is disconnected while the electronic pen is inserted.

In another example, the electronic device may perform the operation for the communication connection with the electronic pen when the electronic device is booted (or rebooted). For example, when the power of the electronic device is turned on, whether information related to the electronic pen exists is identified in the memory, and when there is no related information, the operation for the communication connection with the electronic pen may be performed. For example, when the power of the electronic device is turned on, charging power may be applied to the electronic pen inserted into the housing of the electronic device through the wireless charging circuit, and when information related to the electronic pen does not exist in the memory, the operation for establishing the communication connection with the electronic pen being charged may be performed.

In another example, when information on the electronic pen stored in the memory is initialized, the operation for the communication connection with the electronic pen may be performed. For example, when the user executes a setting menu and initializes information on the electronic pen even though the electronic pen is inserted into the electronic device, is being charged, and is connected for communication, the operation for the communication connection with the electronic pen may be performed.

Figure 14:
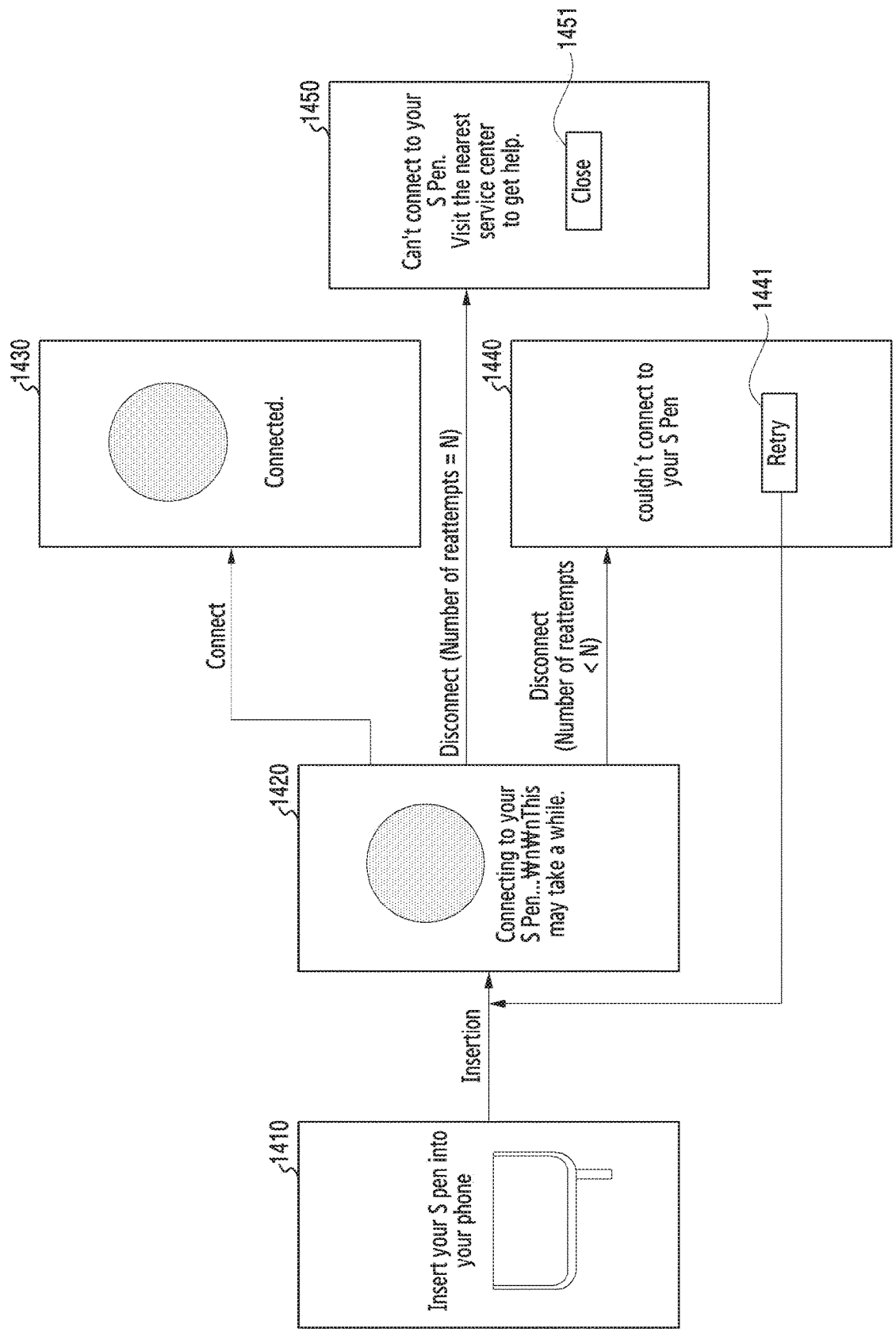
FIG. 14 illustrates an operation for a communication connection between an electronic device and an electronic pen according to an embodiment of the disclosure.

FIG. 14 illustrates an operation for the communication connection between an electronic device and an electronic pen according to an embodiment of the disclosure.

Referring to FIG. 14, an electronic device (e.g., the electronic device 20 of FIG. 1) (e.g., the processor of the electronic device) may perform control to output a screen for a message making a request for inserting an electronic pen (e.g., the electronic pen 10 of FIG. 1) on a display (e.g., the display device 260 of FIG. 2), as indicated by reference numeral 1410. For example, when there is no electronic pen connected for communication and when the electronic pen is not inserted, the electronic device may perform control to display the insertion request screen on the display. Reference numeral 1410 is only an example, and the electronic device may provide a request for inserting the electronic pen through any of various methods. For example, the electronic device may provide the request for inserting the electronic pen through a popup window, a quick panel, or a notification bar.

When the electronic pen is inserted, the electronic device may control to output a screen (hereinafter referred to as a connection attempt screen) indicating that establishment of the communication connection with the inserted electronic pen is attempted through a wireless communication circuit (e.g., the first wireless communication circuit 350 of FIG. 3) to the display, as indicated by reference numeral 1420. At this time, the electronic device may provide charging power to the electronic pen through the wireless communication circuit (e.g., the first wireless communication circuit 350 of FIG. 3), and the electronic pen may output (e.g., broadcast) an advertising signal. Further, the electronic device may verify whether the inserted electronic pen is the same as the electronic pen being charged through any of the various methods.

When the electronic device performs the communication connection with the inserted electronic pen, the electronic device may perform control to output a screen (hereinafter, referred to as a connection completion screen) indicating that the communication with the electronic pen is connected to the display, as indicated by reference numeral 1430. When a predetermined time (e.g., 2 seconds) passes from the output of the connection completion screen, the electronic device may perform control to output an initial screen (e.g., a home screen) to the display.

When the electronic device does not establish the communication connection with the inserted electronic pen, the electronic device may control to output a screen (hereinafter referred to as a non-connection notification screen) indicating that the communication with the electronic pen is not connected to the display, as indicated by reference numeral 1440. The non-connection notification screen may include a retry menu (or button) 1441. When the retry menu 1441 is selected (e.g., touched), the electronic device may perform control to output the connection attempt screen 1420 to the display while retrying the communication connection with the electronic pen. Further, the electronic device may count up the number of retries when the retry menu 1441 is selected.

The non-connection notification screen 1440 may be provided a predetermined number of times (N times). N may be a natural number (e.g., 3). When there is no communication connection between the electronic device and the electronic pen, whether the number of retries is smaller than the predetermined number of times is identified. When the number of retries is smaller than the predetermined number of times, the electronic device may perform control to output the non-connection notification screen 1440 again to the display.

On the other hand, when the number of retries is the same as the predetermined number of times, the electronic device cannot establish the communication connection with the electronic pen, and may perform control to output a screen (hereinafter referred to as a connection-impossible screen) suggesting a visit to a service center to the display, as indicated by reference numeral 1450. The connection-impossible screen may include a close menu 1451. When the close menu 1451 is selected, the electronic device may control to output an initial screen (e.g., a home screen) to the display.

The electronic device need not provide the non-connection notification screen. For example, when non-connection between the electronic device and the electronic pen is displayed on the connection attempt screen 1420, the electronic device may perform control to directly output the connection-impossible screen 1450 to the display.

According to various embodiments of the disclosure, a method of controlling a communication connection of an electronic device (e.g., the electronic device 10 of FIG. 1, the electronic device 201 of FIG. 2, the electronic device 301 of FIG. 3, the electronic device 502 of FIG. 5B, the electronic device 720 of FIGS. 7A and 7B, the electronic device 820 of FIG. 8, the electronic device 920 of FIG. 9, the electronic device 1001 of FIG. 10, or the electronic device 1120 of FIG. 11) may include an operation of detecting whether an electronic pen (e.g., the electronic pen 10 of FIG. 1, the electronic pen 400 of FIG. 4, the electronic pen 51 or 52 of FIG. 5B, the electronic pen 710 of FIGS. 7A and 7B, the electronic pen 810 of FIG. 8, the electronic pen 910 of FIG. 9, the electronic pen 11 of FIG. 10, or the electronic pen 1110 of FIG. 11) is inserted into a recess (e.g., the recess 22 of FIG. 1) inside a housing (e.g., the housing 21 of FIG. 1) of the electronic device, an operation of charging the electronic pen through a wireless charging circuit (e.g., the first wireless charging circuit 340 of FIG. 3) on the basis of the detection, and an operation of receiving inherent information of the electronic pen through a wireless communication circuit during or after the charging; and an operation of maintaining or re-establishing the communication connection with the electronic pen based on a portion of the received inherent information.

The wireless communication circuit may support a Bluetooth protocol.

The inherent information may be a Bluetooth address of the electronic pen.

The maintaining or re-establishing of the communication connection may comprise comparing the received inherent information with reference inherent information stored in a memory of the electronic device; maintaining the communication connection when the received inherent information matches the reference inherent information based on a result of the comparison; re-establishing the communication connection with the electronic pen when the received inherent information does not match the reference inherent information based on a result of the comparison.

The re-establishing of the communication connection may comprise at least one of rebooting the wireless communication circuit; and deleting pairing-related data of a previously connected electronic pen.

The inherent information may be included in an advertising signal of the electronic pen, and the maintaining or re-establishing of the communication connection may comprise randomly turning on or off the wireless charging circuit in response to reception of a plurality of advertising signals from a plurality of electronic pens; and maintaining or re-establishing the communication connection based on whether the advertising signal of the electronic pen or charging-related information contained in the advertising signal is synchronized with an on or off pattern of the wireless charging circuit.

The inherent information may be included in an advertising signal of the electronic pen, and the maintaining or re-establishing of the communication connection may comprise making a request for reducing an intensity of the advertising signal of the electronic pen connected for communication to a preset size or smaller in response to reception of a plurality of advertising signals from a plurality of electronic pens; maintaining the communication connection with the electronic pen in response to continuous reception of the advertising signal having the reduced signal intensity; and re-establishing the communication connection with the electronic pen in response to non-reception of the advertising signal having the reduced signal intensity.

The charging of the electronic pen may comprise applying charging power to the electronic pen by periodically repeating on/off of the wires charging circuit, and the electronic pen may be configured to transmit the advertising signal including the inherent information in an on period of the wireless charging circuit, not to transmit the advertising signal in an off period of the first wireless charging circuit, to transmit the advertising signal in an on period of the first wireless charging circuit, and stop transmission of the advertising signal after maintaining the transmission of the advertising signal for a predetermined time after turning off of the first wireless charging circuit.

The electronic device according to various embodiments of the disclosure may connect for communication by identifying an external electronic device that needs to be connected for communication. For example, the electronic device may provide charging power to the external electronic device and maintain or re-establish the communication connection according to whether the external electronic device to which the charging power is being provided is an external electronic device having a previous communication connection history. According to various embodiments of the disclosure, when a plurality of external electronic devices is found, the external electronic device that is inserted into the electronic device and being charged may be identified (determined) among the plurality of external electronic devices on the basis of charging-related information.

The electronic device may be one of various types of electronic devices. The electronic devices may include, for example, a portable communication device (e.g., a smartphone), a computer device, a portable multimedia device, a portable medical device, a camera, a wearable device, or a home appliance. The electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 240) including one or more instructions that are stored in a storage medium (e.g., internal memory 236 or external memory 238) that is readable by a machine (e.g., the electronic device 20, the electronic device 201). For example, a processor (e.g., the processor 220) of the machine (e.g., the electronic device 20, the electronic device 201) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, according to various embodiments, the integrated component may perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

While the disclosure has been shown described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a housing;
   a touch-screen display exposed through a portion of the housing;
   a first wireless communication circuit disposed inside the housing;
   a recess disposed inside the housing;
   a first wireless charging circuit disposed inside the housing so as to be adjacent to the recess;
   an electronic pen inserted to be removable from the recess, the electronic pen comprising:
      a second wireless communication circuit configured to perform wireless communication with the first wireless communication circuit, and
      a second wireless charging circuit electrically coupled to the first wireless charging circuit;
   a processor disposed inside the housing and operatively coupled to the display, the first wireless communication circuit, and the first wireless charging circuit; and
   a memory operatively coupled to the processor,
   wherein the memory stores instructions causing the processor to, when executed:
      detect whether the electronic pen is inserted into the recess,
      charge the electronic pen through the first wireless charging circuit based on the detection,
      receive inherent information of the electronic pen through the first wireless communication circuit during or after the charging,
      compare the received inherent information with information stored in the electronic device,
      in response to the received inherent information matching the stored information, maintain a communication connection with the electronic pen while the electronic pen is inserted into the recess, and
      in response to the received inherent information not matching the stored information, re-establish a communication connection with the electronic pen while the electronic pen is inserted into the recess.

2. The electronic device of claim 1, wherein the first wireless communication circuit supports a Bluetooth protocol.

3. The electronic device of claim 2, wherein the inherent information is a Bluetooth address of the electronic pen.

4. The electronic device of claim 1, wherein the information stored in the electronic device comprises reference inherent information stored in the memory of the electronic device.

5. The electronic device of claim 1, wherein re-establishing the communication connection comprises at least one of rebooting of at least one of the first wireless communication circuit or the second wireless communication circuit or a deletion of pairing-related data.

6. The electronic device of claim 5,
wherein the inherent information is included in an advertising signal of the electronic pen, and
wherein the instructions further cause the processor to randomly turn on or off the first wireless charging circuit in response to reception of a plurality of advertising signals from a plurality of electronic pens and maintain or re-establish the communication connection based on whether the advertising signal is synchronized with an on or off pattern of the first wireless charging circuit of the plurality of electronic pens.

7. The electronic device of claim 5, wherein the inherent information is included in an advertising signal of the electronic pen, and
wherein the instructions further cause the processor to randomly turn on or off the first wireless charging circuit in response to reception of a plurality of advertising signals from a plurality of electronic pens and maintain or re-establish the communication connection based on whether charging-related information included in the advertising signal is synchronized with an on or off pattern of the first wireless charging circuit of the plurality of electronic pens.

8. The electronic device of claim 5,
wherein the inherent information is included in an advertising signal of the electronic pen, and
wherein the instructions further cause the processor to:
make a request for reducing an intensity of the advertising signal of the electronic pen connected for communication to a preset size or smaller in response to reception of a plurality of advertising signals from a plurality of electronic pens,
maintain the communication connection with the electronic pen in response to continuous reception of the advertising signal having the reduced signal intensity, and
re-establish the communication connection with the electronic pen in response to non-reception of the advertising signal having the reduced signal intensity.

9. The electronic device of claim 1, wherein the instructions further cause the processor to provide notification that the electronic pen inserted into the recess has an error when the inherent information is not received.

10. The electronic device of claim 1, wherein the instructions further cause the processor to apply charging power to the electronic pen by periodically repeating on and off of the first wireless charging circuit.

11. The electronic device of claim 10, wherein the electronic pen is configured to:
transmit an advertising signal including the inherent information in an on period of the first wireless charging circuit,
not transmit the advertising signal in an off period of the first wireless charging circuit,
transmit the advertising signal in an on period of the first wireless charging circuit, and
stop transmission of the advertising signal after maintaining the transmission of the advertising signal for a predetermined time after turning off of the first wireless charging circuit.

12. A method of controlling a communication connection by an electronic device, the method comprising:
detecting whether an electronic pen is inserted into a recess inside a housing of the electronic device;
charging the electronic pen through a wireless charging circuit based on the detection;
receiving inherent information of the electronic pen through a wireless communication circuit during or after the charging;
comparing the received inherent information with information stored in the electronic device; and
maintaining or re-establishing the communication connection with the electronic pen based on a result of the comparison while the electronic pen is inserted into the recess,
wherein the maintaining or re-establishing of the communication connection comprises:
in response to the received inherent information matching the stored information, maintaining a communication connection with the electronic pen while the electronic pen is inserted into the recess, and
in response to the received inherent information not matching the stored information, re-establishing a communication connection with the electronic pen while the electronic pen is inserted into the recess.

13. The method of claim 12, wherein the wireless communication circuit supports a Bluetooth protocol.

14. The method of claim 13, wherein the inherent information is a Bluetooth address of the electronic pen.

15. The method of claim 12,
wherein the information stored in the electronic device comprises reference inherent information stored in a memory of the electronic device.

16. The method of claim 12, wherein the re-establishing of the communication connection comprises at least one of:
rebooting the wireless communication circuit; or
deleting pairing-related data of a previously connected electronic pen.

17. The method of claim 16,
wherein the inherent information is included in an advertising signal of the electronic pen, and
wherein the maintaining or re-establishing of the communication connection comprises:
randomly turning on or off the wireless charging circuit in response to reception of a plurality of advertising signals from a plurality of electronic pens, and
maintaining or re-establishing the communication connection based on whether the advertising signal of the electronic pen or charging-related information contained in the advertising signal is synchronized with an on or off pattern of the wireless charging circuit.

18. The method of claim 16,
wherein the inherent information is included in an advertising signal of the electronic pen, and
wherein the maintaining or re-establishing of the communication connection comprises:
making a request for reducing an intensity of the advertising signal of the electronic pen connected for communication to a preset size or smaller in response to reception of a plurality of advertising signals from a plurality of electronic pens,
maintaining the communication connection with the electronic pen in response to continuous reception of the advertising signal having the reduced signal intensity, and
re-establishing the communication connection with the electronic pen in response to non-reception of the advertising signal having the reduced signal intensity.

19. The method of claim 12,
wherein the charging of the electronic pen comprises applying charging power to the electronic pen by periodically repeating on/off of the wireless charging circuit, and
wherein the electronic pen is configured to:
- transmit an advertising signal including the inherent information in an on period of the wireless charging circuit,
- not transmit the advertising signal in an off period of the wireless charging circuit,
- transmit the advertising signal in an on period of the wireless charging circuit, and
- stop transmission of the advertising signal after maintaining the transmission of the advertising signal for a predetermined time after turning off of the wireless charging circuit.

20. An electronic device comprising:
a housing;
a touch-screen display exposed through a portion of the housing;
a first wireless communication circuit disposed inside the housing;
a recess disposed inside the housing;
a first wireless charging circuit disposed inside the housing to be adjacent to the recess;
a processor disposed inside the housing and operatively coupled to the display, the first wireless communication circuit, and the first wireless charging circuit; and
a memory operatively coupled to the processor,
wherein the memory stores instructions causing the processor to, when executed:
detect whether an electronic pen is inserted into the recess,
charge the electronic pen through the first wireless charging circuit based at least in part on the detection,
perform a scan through the first wireless communication circuit in order to identify information on the electronic pen,
turn on or off the first wireless charging circuit in a predetermined pattern in response to discovery of a plurality of electronic pens through the scan,
identify the electronic pen inserted into the recess among the plurality of electronic pens based on charging-related information included in advertising signals received from the plurality of found electronic pens, and
establish a communication connection with the identified electronic pen.

* * * * *